(12) United States Patent
Ochiai et al.

(10) Patent No.: US 6,392,721 B1
(45) Date of Patent: May 21, 2002

(54) LIQUID CRYSTAL DISPLAY DEVICE HAVING WIRING LINE INCLUDING FIRST AND SECOND LAYERS WITH SECOND LAYER HAVING A THICKNESS NOT GREATER THAN 1/2 OF A THICKNESS OF FIRST LAYER

(75) Inventors: Takahiro Ochiai, Mobara; Toshiki Kaneko, Chiba; Takuya Takahashi; Kazumi Fujii, both of Hitachi, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/411,254

(22) Filed: Oct. 4, 1999

(30) Foreign Application Priority Data

Oct. 2, 1998 (JP) ............................................. 10-281166

(51) Int. Cl.⁷ ........................ G02F 1/136; G02F 1/1333; G02F 1/1343
(52) U.S. Cl. .............................. 349/42; 349/43; 349/46; 349/54; 349/139; 349/140
(58) Field of Search ............................. 349/43, 46, 54, 349/139, 140; 257/59, 347

(56) References Cited

U.S. PATENT DOCUMENTS

| 5,162,933 A | * | 11/1992 | Kakuda et al. | 359/59 |
| 5,670,062 A | | 9/1997 | Lin et al. | 216/108 |
| 5,693,983 A | | 12/1997 | Ho et al. | 257/763 |
| 5,739,877 A | * | 4/1998 | Onisawa et al. | 349/42 |
| 5,771,083 A | * | 6/1998 | Fujihara et al. | 349/147 |
| 5,969,386 A | * | 10/1999 | Hong | 257/347 |
| 5,995,177 A | * | 11/1999 | Fujikawa et al. | 349/46 |

FOREIGN PATENT DOCUMENTS

| JP | 6-177381 | 6/1994 |
| JP | 8-116065 | 5/1996 |
| JP | 9-197435 | 7/1997 |
| JP | 316024/92 | 11/2000 |

* cited by examiner

Primary Examiner—William L. Sikes
Assistant Examiner—Julie Ngo
(74) Attorney, Agent, or Firm—Antonelli, Terry, Stout & Kraus, LLP

(57) ABSTRACT

A liquid crystal display device has good contact characteristics between an etched side end portion of a lower layer wiring line and an insulating film and the like, satisfactory step coverage, and satisfactory adhesion to a substrate so that disconnection of an upper layer wiring line and short-circuiting of the lower layer wiring line can be prevented to improve reliability. The liquid crystal display device comprises a wiring line having a laminated structure including a first layer which is made from a first metal layer formed over an insulating substrate and a second layer which is made from a second metal layer different from the first metal layer and is formed over the first metal layer, and the side end face of the first layer has a right-tapered shape with a taper angle of 60° or less, while the side end face of the second layer is approximately perpendicular to or counter-tapered with respect to the insulating substrate. The second layer has a thickness not greater than ½ of that of the first layer.

14 Claims, 16 Drawing Sheets

Ratio between the thickness of 2B and 2A (a/b)

Cr/Cr+30Mo

Cr/Cr-50Mo

Cr/Cr-30Mo

Cr/Cr-50Mo

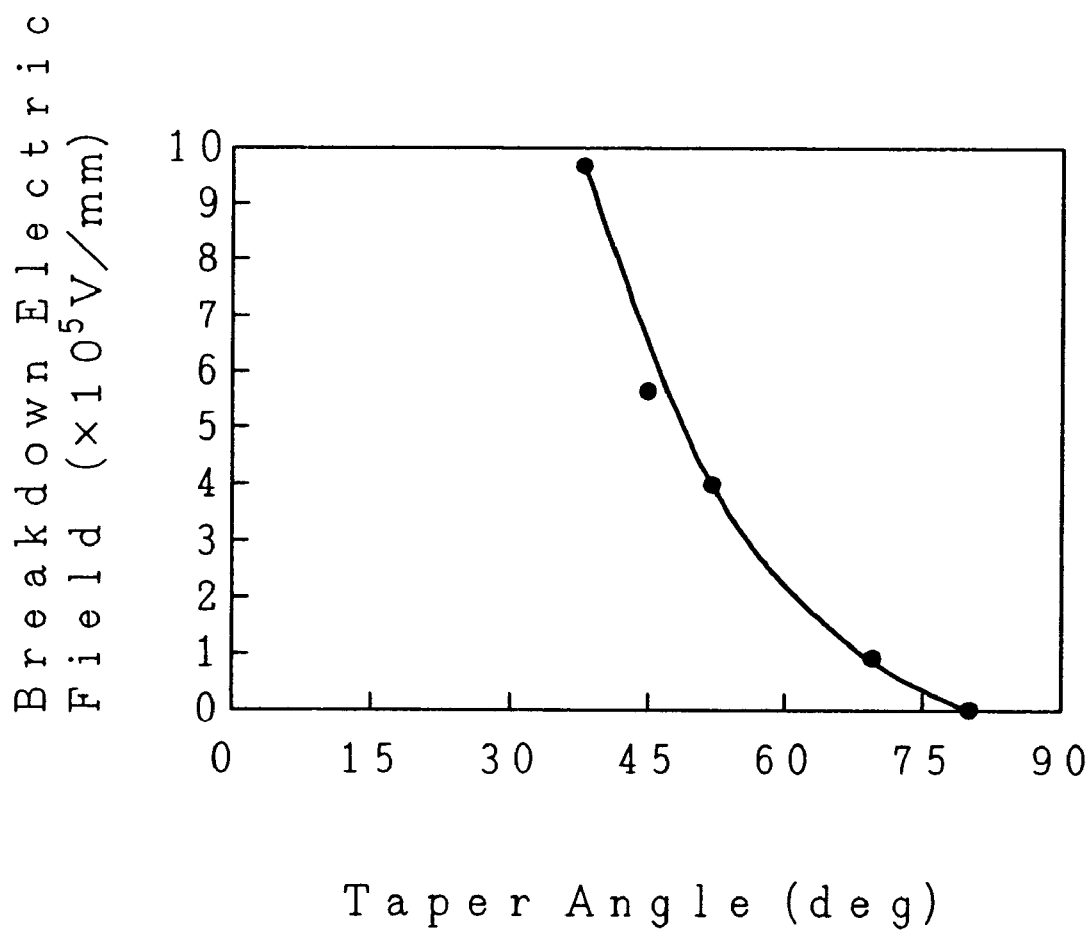

LIQUID CRYSTAL DISPLAY DEVICE HAVING WIRING LINE INCLUDING FIRST AND SECOND LAYERS WITH SECOND LAYER HAVING A THICKNESS NOT GREATER THAN 1/2 OF A THICKNESS OF FIRST LAYER

BACKGROUND OF THE INVENTION

The present invention relates to a liquid crystal display device; and, more particularly, the invention relates to a liquid crystal display device in which the production yield is improved by eliminating the occurrence of a disconnection of a wired laminated portion in an active matrix liquid crystal display device of a thin film transistor (TFT) type or the like, as well as to a method of manufacturing the same.

Liquid crystal display devices have been widely utilized for displaying a variety of images, including still images and motion images. These liquid crystal display devices are basically classified into a first type (called the "simple matrix type") wherein a liquid crystal layer is sandwiched between two substrates, at least one of which is made of transparent glass, and wherein a predetermined pixel is turned on/off by applying a voltage selectively to the various electrodes formed on the substrates for forming the pixels; and a second type (called the "active matrix type") in which thin film transistors (TFTS) are used as the switching elements, and wherein the various electrodes and pixel selecting switching elements are formed so that a predetermined pixel is turned on/off by selecting the switching elements.

In particular, the latter active matrix type liquid crystal display device has become very popular because of its contrast performance, its quick display performance and the like. In the active matrix type liquid crystal display device, the longitudinal field type device has been generally adopted, in which an electric field for changing the orientation of a liquid crystal layer is applied between electrodes formed on one substrate and electrodes formed on the other substrate. In recent years, however, a transverse field type (In-Plane Switching Mode: IPS type) liquid crystal display device has been developed, in which the direction of the electric field to be applied to the liquid crystal is generally in parallel with the substrate face.

FIG. 16 is an exploded perspective diagram illustrating the basic structure of one example of an active matrix type liquid crystal display device to which the present invention is applied. FIG. 16 shows a specific structure of the liquid crystal display device (or a module which includes a liquid crystal display panel, a circuit substrate, a back light and other components in an integrated form: the module is called "MDL") according to the present invention.

The liquid crystal display device has a shield case (also called the "metal frame") SHD made of a metal sheet; a display window WD; insulating sheets INS1 to INS3; circuit substrates, of which: PCB1 denotes a drain side circuit substrate and a video signal line driving circuit substrate; PCB2 denotes a gate side circuit substrate and a scanning signal line driving circuit substrate; and PCB3 denotes an interface circuit substrate; joiners JN1 to JN3 for joining the circuit substrates PCB1 to PCB3 electrically; tape carrier packages TCP1 and TCP2; a liquid crystal display panel PNL; a rubber cushion GC; a shielding spacer ISL; a prism sheet PRS; a scattering sheet SPS; a light guide board GLB; a reflection sheet RFS; a lower case (or mold frame) MCA, formed by integral molding and having an opening MO; a fluorescent lamp LP; a lamp cable LPC; a pressure sensitive adhesive double coated tape BAT, a rubber bushing GB for supporting the fluorescent lamp LP; and a back light BL composed of the fluorescent lamp and the light guide board. The scattering sheet members are stacked in the shown arrangement to assemble the liquid crystal display module MDL.

The liquid crystal display module MDL includes two kinds of accommodating/holding members of the lower case MCA and the shield case SHD and is constructed by integrating the metallic shield case SHD accommodating and fixing the insulating sheets INS1 to INS3, the circuit substrates PCB1 to PCB3 and the liquid crystal display panel PNL, and the lower case MCA accommodating the back light BL composed of the fluorescent lamp LP, the light guide board GLB, the prism sheet PRS and the like.

On each of the drain side circuit substrate PCB1 and the gate side circuit substrate PCB2, there is mounted an integrated circuit chip for driving the individual pixels of the liquid crystal display panel PNL. On the interface circuit substrate PCB3, there are mounted an integrated circuit chip for receiving video signals from an external host and control signals, such as timing signals, a timing converter (TCON) for generating clock signals by processing the timings, and the like. The clock signals generated by the timing converter are fed to the integrated circuit chip through a clock signal line which is laid on the interface circuit substrate PCB3 as well as the drain side circuit substrate PCB1 and the gate side circuit substrate PCB2. The interface circuit substrate PCB3, the drain side circuit substrate PCB1 and the gate side circuit substrate PCB2 are multi-layered wiring substrates, and the clock signal line is formed as an inner wiring line of the interface circuit substrate PCB3, the drain side circuit substrate PCB1 and the gate side circuit substrate PCB2.

Here, the liquid crystal display panel PNL is constructed by joining the TFT substrate having TFTs and various wiring lines/electrodes and the filter substrate having the color filter and by seating the liquid crystal material in the clearance between the two substrates, such that the drain side circuit substrate PCB1 for driving the TFTs, the gate side circuit substrate PCB2 and the interface circuit substrate PCB3 are connected by the tape carrier packages TCP1 and TCP2, and such that the individual circuit substrates are connected by the joiners JN1, JN2 and JN3.

FIG. 17 is a schematic diagram illustrating the wired structure in the vicinity of one pixel of the TFT substrate forming the liquid crystal display device shown in FIG. 16. Reference numeral 1 designates a substrate; numeral 2 denotes a scanning signal line (a gate line, a gate wiring line or a gate electrode); numeral 2 denotes an adjacent scanning signal line (an adjoining gate line), numeral 3 denotes a video signal line (a drain line or a drain electrode); numeral 4 denotes a source electrode (a source line or a source electrode); numeral 5 denotes a pixel electrode; letters TFT designate a thin film transistor; and letters Cadd designate a capacity added element.

In FIG. 17, the central portion of the substrate 1, except for the periphery, provides a display area which is filled up with a liquid crystal in the clearance which is formed by joining the other substrate (filter substrate) to it. In this display area, moreover, there are formed the scanning signal line 2 (or gate line) extending in the X-direction, as viewed in FIG. 17, and the video signal line 3 (or drain line) extending in the Y-direction. There is further formed the source electrode 4 which extends in the Y-direction, while being insulated from the scanning signal line 2 and which also extends in the X-direction. The region defined by the scanning signal line 2 and the video signal line 3 constitutes one region for each pixel. In other words, the aforementioned display area is formed of a set of numerous pixel regions arranged in a matrix shape.

Each pixel region is composed of a thin film transistor TFT to be turned on when the scanning signal is fed from the scanning signal line 2 and the video signal line 3, and a pixel electrode 5 which receives a video signal from the video signal line 3 through the thin film transistor TFT, which is turned on. In addition to the thin film transistor TFT and pixel electrode 5, a capacity added clement Cadd is formed between the scanning signal line 2' adjoining the scanning signal line 2 for driving the thin film transistor TFT and the aforementioned pixel electrode 5. This capacity added clement Cadd is provided for storing the video signal in the pixel electrode 5 for a long time even when the thin film transistor TFT is turned off.

In this kind of liquid crystal display device, the aforementioned various wiring lines for selecting the pixels are formed over the substrate 1 by using various filming and patterning techniques. For the wiring lines of the active matrix liquid crystal display device of the thin film transistor type, there is employed a refractory metal which has few hillocks. This wiring material can be exemplified by chromium (Cr) and molybdenum (Mo) as a pure metal. An alloy material to be used is exemplified by an alloy of Cr and Mo or an alloy of Mo and tungsten (W). Of the pure metals, Cr is excellent in the adhesion to the substrate and the resist and is featured in the etching end portion, which is worked at a right angle with respect to the substrate face, when the wiring line is etched. When the wiring lines (or lower layer wiring lines) arc formed in the lowermost layer of the substrate by using a material having such characteristics, a so-called "step coverage" at the vertical wall of the etching end is deteriorated by the insulating film or the like which is formed over the lower wiring lines. This causes problems, such as a deterioration in the breakdown voltage or a disconnection of the portions where the lower wiring lines are crossed over by other wiring lines (or upper wiring lines) formed over the former.

FIG. 18 is a partial section view showing the structure in the vicinity of the TFT of an example of the construction of a typical liquid crystal display device. As shown in FIG. 16, the panel comprises a TFT substrate 1; a filter substrate 1'; a scanning signal line (or gate-electrode) 2; a video signal line (or drain electrode) 3; a source electrode 4; a pixel electrode 5; an insulating film 6; a semiconductor layer 7; a contact layer 7A; a passivation film 8; a contact hole 8A; a color filter 9; a black matrix 10; a smoothing layer 11; a common electrode 12; a thin film transistor TFT; a capacity added element Cadd; and a liquid crystal material LC.

At the TFT portion over the TFT substrate 1, as shown in FIG. 17, the gate signal line 2, the insulating film 6, the semiconductor layer 7, the contact layer 7A, the drain signal line 3, the source signal line 4, the protective film 8, the pixel electrode 5 and the like are stacked in a multi-layered structure photographic processing and patterning using etching treatment. In the capacity added portion, the adjoining gate electrode 2', the insulating film 6, the passivation film 8 and the pixel electrode 5 are likewise laminated.

As described hereinabove, the gate signal line 2 formed in the lowermost layer of the substrate 1, is made of either pure Cr or a Cr—Mo alloy and is worked at its end portion (or side end face) at a right angle with respect to the face of the substrate 1 by etching treatment. As a result, the insulating film 6 formed thereover insufficiently covers its edge portion, as shown, by the normal wall face. In addition, according to the conventional manufacturing process, the drain signal line 3 and the source signal line 4 are formed over the insulating film 6. However, at the portions where the drain signal line 3 and the source signal line 4 ride over the edges of the gate signal line 2, the insulation gap or the film thickness becomes insufficient, as shown, resulting in the problems of a drop in breakdown voltage, short-circuiting or disconnection.

On the other hand, a wiring line made of pure Cr is troubled by the problem that its upper face is exposed to the dry etching atmosphere to produce a fluoride, which tends to deteriorate the contact characteristics with the film formed thereover. If the wiring line is made of a Cr—Mo or Mo—W alloy, the adhesion to a bed or substrate is weakened, which tends to raise a problem in that the wiring line is easily separated by thermal hysteresis after being filmed.

A technique is disclosed in Unexamined Published Japanese Patent Application No. 7-301822 for solving the problem of step coverage in the formation of wiring lines. According to this technique, two alloy layers having different compositions of Cr and Mo are formed as the wiring line material by a sputtering method or the like so that the etched end portion may be right-tapered merely by making use of the difference in the etching rate between the lower layer and the upper layer.

To solve the above-described problem of step coverage, the present applicant has proposed a technique which uses a laminated wiring line which includes a lower layer using pure Cr (a wiring line or electrode containing Cr whose purity is 90% or, more) and an upper layer using a Cr—Mo alloy, in place of technique which uses pure Cr or a Cr alloy film for wiring lines for gate signal lines and drain/source lines. In this laminated wiring line, the overlying Cr—Mo alloy layer realizes low contact resistance to ITO (indium tin oxide) which constitutes the pixel electrodes, while the underlying pure Cr lower layer realizes good adhesion to an insulating substrate and a semiconductor (a-Si) substrate. In addition, since Cr—Mo alloys produce low stress compared to pure Cr, the laminated wiring line made of a Cr—Mo alloy layer and pure Cr produces lower stress than a wiring line formed from a pure Cr short film, whereby the probability of occurrence of a disconnection due to film stress can be decreased in the laminated wiring line.

Regarding workability, an etched side end face can be worked into a right-tapered shape by utilizing the corrosion potential difference between pure Cr and a Cr—Mo alloy, that is, an electrochemical reaction. When ceric ammonium nitrate is used as an etching liquid (etchant), the corrosion potential of Cr-50Mo (a Cr—Mo alloy containing 50 wt. % of Mo; similarly, a Cr—Mo alloy containing 30 wt. % of Mo is abbreviated Cr-30Mo) and the corrosion potential of pure Cr are +1,080 mV and +1,100 mV, respectively; that is to say, the corrosion potential of pure Cr is 20 mV higher than that of Cr-50Mo. Accordingly, the electrochemical reaction occurs in a laminated film in which an upper layer of Cr—Mo alloy is disposed on a lower layer of pure Cr, whereby the overlying Cr—Mo alloy layer has a faster etching rate than the pure Cr layer and the etched side end face of the underlying pure Cr layer is worked into a tapered shape.

In the above-described technique, if the laminated film includes an upper Cr—Mo alloy layer and a lower pure Cr layer, the etched side end face of the upper layer is worked into a perpendicular or counter-tapered shape. If the thickness ratio between the upper layer and the lower layer (the ratio of the film thickness of the upper layer to the film thickness of the lower layer) is large, the step coverage of the etched side end face of the upper layer film by an insulating film formed over the upper layer film deteriorates. It is, therefore, desirable to reduce the thickness ratio (to 0.5 or less, preferably 0.3 or less). However, as the thickness ratio is made smaller, the taper angle of the etched side end face of the laminated film becomes larger, resulting in the problem that the step coverage of the insulating film or the like formed over the laminated film deteriorates.

To cope with the above-described problem, if the Mo content in the overlying Cr—Mo alloy layer is increased so that the corrosion potential of the Cr—Mo alloy layer is reduced so as to accelerate an electrochemical reaction with pure Cr, the thickness ratio between the upper layer and the lower layer can be reduced so that the shape of the taper of the etched side end face can be improved. However, if the Mo content in the Cr—Mo alloy layer is increased, the adhesion between the Cr—Mo alloy layer and a resist which serves as an etching mask deteriorates and may cause a failure, such as a disconnection due to resist peeling.

SUMMARY OF THE INVENTION

An object of the prevent invention is to solve the aforementioned various problems and to provide a liquid crystal display device of improved reliability by improving the contact characteristics between the lower layer wiring line and the upper conductor film, by improving the step coverage of the upper film such as the insulating film, by improving the adhesion to the substrate and by preventing the cutting of the upper layer wiring line and the short-circuiting of the lower layer wiring line.

In order to achieve the above-specified object, the present invention utilizes the difference in corrosion rate due to the corrosion potential difference between different kinds of metals and is characterized by adopting techniques which will be described below:

(1) A liquid crystal display device comprises a wiring line having a laminated structure including a first layer which is made from a first metal layer formed over an insulating substrate and a second layer which is made from a second metal layer different in corrosion potential from the first metal layer and is formed over the first metal layer, wherein the first layer has an end face formed in a shape right-tapered at 60° or less with respect to the insulating substrate, the second layer has an end face formed in a shape substantially perpendicular to or counter-tapered with respect to the insulating substrate, and the second layer has a thickness not greater than ½ of that of the first layer.

(2) A liquid crystal display device comprises: one substrate having a plurality of wiring lines including a scanning signal line, a video signal line and a pixel electrode, and an active element connected with the scanning signal line and the video signal line for controlling ON/OFF operation of a pixel; another substrate including at least a color filter and adhered through a minute clearance to the aforesaid one substrate; and a liquid crystal filled in a clearance between the one substrate and the aforesaid other substrate;

wherein at least the wiring line of the scanning signal line has a laminated structure including a first layer formed over the one substrate and made of pure chromium, and a second layer formed over the first layer and made of chromium and molybdenum as its principal components, and the first layer has a side end face formed in a shape right-tapered at 60° or less, while the second layer has an end face formed in a shape substantially perpendicular to or counter-tapered, e.g. greater than 90°, with respect to an insulating substrate and has a thickness not greater than ½ of that of the first layer.

(3) A liquid crystal display device comprises: one substrate having a plurality of wiring lines including a scanning signal line, a video signal line and a pixel electrode, and an active element connected with the; scanning signal line and the video signal line for controlling ON/OFF operation of a pixel; another substrate including at least a color filter and adhered through a minute clearance to the one substrate; and a liquid crystal filled in a clearance between the one substrate and the aforesaid other substrate;

wherein a bed layer made from a thin-film layer of an insulating material is formed over at least the one substrate, the wiring line of the scanning signal line is made from an alloy layer containing chromium and molybdenum as its principal components, and a pure chromium layer is interposed between the alloy layer and the bed layer, and the first layer has a side end face formed in a shape right-tapered at 60° or less, while the second layer has an end face formed in a shape substantially perpendicular to or counter-tapered with respect to an insulating substrate and has a thickness not greater than ½ of that of the first layer.

(4) A liquid crystal display device comprises: one substrate having a plurality of wiring lines including a gate line, a drain line, a video signal line and a pixel electrode, and an active element connected with the gate line, the drain line and the video signal line for controlling ON/OFF operation of a pixel; another substrate including at least a color filter and adhered through a minute clearance to the one substrate; and a liquid crystal filled in a clearance between the one substrate and the aforesaid other substrate;

wherein a bed layer made from a thin-film layer of an insulating material is formed over at least the one substrate, the gate line has a laminated structure including a first layer made from a pure chromium layer formed over the one substrate, and a second layer formed over the first layer and made of chromium and molybdenum as its principal components, and the drain line has a single-layer structure made from an alloy layer containing chromium and molybdenum as its principal components, and the first layer has a side end face formed in a shape right-tapered at 60° or less, while the second layer has an end face formed in a shape substantially perpendicular to or counter-tapered with respect to a substrate and has a thickness not greater than ½ of that of the first layer.

(5) A liquid crystal display device comprises: one substrate having a plurality of wiring lines including a gate line, a drain line, a video signal line and a pixel electrode, and an active element connected with the gate line, the drain line and the video signal line for controlling ON/OFF operation of a pixel; another substrate including at least a color filter and adhered through a minute clearance to the one substrate; and a liquid crystal filled in a clearance between the one substrate and the aforesaid other substrate;

wherein a bed layer-made from a thin-film layer of an insulating material is formed over at least the one substrate, each of the gate line and the drain line has a laminated structure including a first layer made from a pure chromium layer formed over the one substrate, and a second layer formed over the first layer and made of chromium and molybdenum as its principal components, and the first layer has a side end face formed in a shape right-tapered at 60° or less, while the second layer has an end face formed in a shape substantially perpendicular to or counter-tapered with respect to a substrate face and has a thickness not greater than ½ of that of the first layer.

(6) In the device of paragraphs (4) or (5), the bed layer made from the thin-film layer of the insulating material is formed over at least the one substrate, and the plurality of wiring lines having the gate line, the drain line, the video signal line and the pixel electrode, and the active element connected with the gate line, the drain line and the video signal line for controlling ON/OFF of the pixel are formed over the bed layer.

(7) In the device of paragraphs (2) to (6), the gate line has a two-layer structure and the pixel electrode is formed of an indium tin oxide film, and an added capacity element is formed by the pixel electrode and an insulating layer formed, between the gate line and the pixel electrode.

(8) A method of manufacturing a liquid crystal display device which includes: one substrate having a plurality of wiring lines including a scanning signal line, a video signal line and a pixel electrode, and an active element connected with the scanning signal line and the video signal line for controlling ON/OFF operation of a pixel; another substrate including at least a color filter and adhered through a minute clearance to the one substrate; and a liquid crystal filled in a clearance between the one substrate and the aforesaid other substrate;

the method comprising the steps of:
preparing the scanning signal line as a thin film having a laminated structure including a lower layer and an upper layer which are respectively made of metals having different compositions;
dipping the thin film in an etching liquid to which a corrosion potential conditioning liquid is added; and
setting the corrosion potential of the upper layer to be lower than a corrosion potential of the lower layer in the etching liquid to cause an electrochemical reaction between the upper layer and the lower layer and make the etching rate of the upper layer having a lower corrosion potential faster than the etching rate of the lower layer, thereby to form a right-taper on a side end face of the lower layer of the thin film having the laminated structure and to give a side end face of the upper layer a shape perpendicular to or counter-tapered with respect to a substrate face.

In each of the above-described constructions, if a laminated structure having its upper layer made from a Cr—Mo alloy layer and its lower layer made from a pure Cr layer is adopted and an insulating film formed over this laminated film has a thickness, for example, of 300 to 400 nm, the thickness of the Cr—Mo alloy layer containing Cr and 50 wt. % of Mo is set to 20 nm, while the thickness of the pure Cr lower layer is set to 180 mm, so that the step coverage of the insulating film does not deteriorate even if the shape of the etched side end face of the upper layer is perpendicular or counter-tapered.

An aqueous solution of ceric ammonium nitrate (15 wt. %) to which nitric acid $HNO_3$(10 vol. %) is added is used as an etching liquid. In this etching liquid, the corrosion potentials of Cr—Mo and pure Cr are 1,100 mV and 1,140 mV, respectively, and there is a corrosion potential difference of 40 mV between both. In an aqueous solution of ceric ammonium nitrate (15 wt. %) to which nitric acid is not added, the corrosion potentials of Cr—Mo and pure Cr are 1,080 mV and 1,100 mV, respectively, and the corrosion potential difference between both is 20 mV. In other words, the etching liquid to which nitric acid is added works to increase the corrosion potential difference between Cr—Mo and pure Cr.

By increasing the corrosion potential difference, an electrochemical reaction between Cr—Mo and pure Cr proceeds so that the taper angle of an etched side end edge can be made low even in the case of the same film construction. As will be described later in detail in connection with an embodiment, if the taper angle of the etched side end edge of the laminated film is made 60° or less, the insulation breakdown voltage of the insulation film formed over the laminated film becomes high and the step coverage of the etched side end edge is improved.

It is to be noted that, for example, even in the case of a three-layer film structure (Cr—Mo alloy/Al alloy/pure Cr), by adding nitric acid to an etching liquid, it is possible to change the corrosion potentials of the Cr—Mo alloy and pure Cr, whereby the taper angle of an etched side end edge can be made low even in the case of the same film construction. In addition, if a difference in corrosion potential is produced between the upper layer and the lower layer and the corrosion potential of the upper layer is set to be lower than that of the lower layer, side etching proceeds in the upper layer and side etching proceeds faster in the upper portion of the lower layer and in the lower portion of the same when both layers are dipped in the same etching liquid, to which nitric acid is added as a corrosion potential conditioning liquid.

FIG. 5 is a diagram showing a state in which the etching proceeds by an electrochemical reaction with a difference in the corrosion potential between the upper layer and the lower layer. A wiring layer having a two-layered laminated structure is formed over the substrate 1 and is composed of a first layer 2A and a second layer 2B. The first or lower layer 2A is made of pure chromium (Cr) whereas the second layer or upper layer 2B is made of an chromium-molybdenum (Cr—Mo) alloy. Then, by setting the corrosion potential of the first layer 2A in the etchant high (H) and the corrosion potential of the second layer 2B low (L), an electrochemical reaction is caused between these two layers when they are dipped in the etchant. By this electrochemical reaction, the etching proceeds, as indicated by arrow E. Under the influence of the electrochemical reaction, the etching rate takes its maximum at the interface between the upper and lower layers, so that the lower layer 2A is worked at its whole side end face into a right-tapered shape at an angle of not greater than 60° with respect to the face of the substrate 1, whereas the upper layer 2B is worked at its side end face into either a shape normal to the face of the substrate 1, i.e. 90°, or a slightly counter-tapered shape, i.e. an angle greater than 90° with respect to the face of the substrate 1.

When the etching rate of the upper layer is thus relatively accelerated by the electrochemical reaction between the upper and lower layers formed of two kinds of different compositions, it is essential to set the corrosion potential of the upper layer higher than that of the lower layer. In addition, to work the side end face into a right-tapered shape, the side etching of the upper layer needs to proceed even during the etching of the lower layer. Accordingly, the upper and lower layers need to be made of an identical alloy so that the etching of the upper and lower layers proceeds with an identical etchant, or these layers need to be made of different metals formed by materials which can be etched with an identical etchant.

If the corrosion potential difference between both layers is excessively large, only the upper layer is abruptly etched, but the etching of the lower layer does not proceed, or even if the lower layer is etched, the taper angle of the lower layer becomes small. It has been experimentally found that the corrosion potential difference between the upper and lower layers is desirably between 10 mV or more and 300 mV or less. In particular, the desired taper angle was obtained at 30 mV or more to 200 mV or less. If this condition is satisfied, a wiring line having the desired taper shape can be formed by forming the upper and the lower layer into a laminated structure irrespective of the respective etching rates of the upper and lower layers or even if the etching rate of the composition of the lower layer is higher than the etching rate of the upper layer.

Since the wiring line formed over the substrate is given a taper shape in this manner, the step coverage of the insulating film to be formed over the wiring line is improved, thereby to solve problems such as a deterioration in insulating breakdown voltage, and cracks which may be formed in a thin film (or CVD film), such as a CVD insulating film, at the portions where the lower layer wiring line is ridden over by another wiring line (or upper wiring line) formed at the upper portion, causing a disconnection of the drain wiring line or the source wiring line to be formed over such portions. Here, during the etching treatment which makes use of the aforementioned electrochemical reaction, if the thickness of the upper layer is made small, a failure in the step coverage of the film to be formed over the upper layer can be avoided even if the upper layer has a side end face set at a right angle or counter-tapered with respect to the substrate face.

FIG. 19 shows the relationship between the taper angle of the etched side end of a laminated film and the insulating breakdown voltage of the laminated film, with the insulating film (silicon nitride, 300 nm thick) being formed over the laminated film, which is made of an upper layer of Cr—Mo alloy (20 nm thick) and a lower layer of Cr (180 mm thick). As the taper angle becomes smaller, the breakdown electric field (the insulating breakdown electric field) becomes higher, and when the taper angle becomes 60° or less, the breakdown electric field becomes $2.5 \times 10^5$ V/mm or more. An electric field to be applied to a TFT during a characteristic inspection and a characteristic correction for the TFT is a maximum of $2.5 \times 10^5$ V/mm. Therefore, the taper angle of the etched side end of the laminated film needs to be 60° or less so that a dielectric breakdown can be prevented from occurring in the insulating film owing to the electric field of a maximum of $2.5 \times 10^5$ V/mm (60 V, as the potential difference of a maximum) to be applied during the characteristic inspection and the characteristic correction for the TFT.

FIG. 6 is an explanatory diagram of a change in the length of cracks which tend to extend in the CVD film formed in the gate wiring portion when the thickness ratio between the upper layer and the lower layer is changed. The horizontal axis represents the ratio a/b between the film thickness a of the lower layer and the film thickness b of the upper layer, and the vertical axis represents the crack length (nm). In the section of the film of FIG. 6, CL designates cracks.

As shown in FIG. 6, if the thickness a of the upper layer 2B is larger than the thickness b of the lower layer 2A, that is, the ratio a/b is not less than 1, the coverage of the gate line 2 of the CVD film by the insulating film 6 is imperfect and long cracks occur. On the other hand, as the ratio a/b decreases, cracks less easily occur, and when the ratio a/b is not greater than 0.5, the occurrence of cracks abruptly decreases. When the ratio a/b is not greater than 0.3, almost no cracks occur, and the breakdown voltage between a gate and a drain is improved.

If the upper layer 2B is formed to have a small thickness so that the ratio a/b becomes 0.5 or less, preferably 0.3 or less, cracks do not at all occur or can be brought to a state in which problems do not occur in practical terms. For example, if the thickness of the lower layer 2A is made 200 nm, an excellent step coverage in which almost no cracks occur can be realized by reducing the thickness of the upper layer 2B to 60 nm or less. As the thickness of the upper layer 2B is made smaller, the influence of cracks on the insulating film formed over the upper layer 2B can be made smaller. Since the film thickness indispensable for forming the thin film over the entire substrate is 10 nm or more, it is desirable that the thickness of the upper layer 2B be between 10 or more nm and 60 or less nm.

If a material is dipped in a certain solution, an oxidation-reduction potential of the material is developed in the solution. In a corrosion-environmental solution, an oxidation-reduction potential due to the melting of the material, i.e., a corrosion potential, is developed. If two different kinds of electrodes are dipped in an identical solution, the respective electrodes exhibit different corrosion potentials. If these electrodes are connected to each other, a potential difference occurs between the two kinds of electrodes and a current flows therebetween. This construction is called a galvanic cell, and the current is called a galvanic current. In this galvanic cell, an electrode at a lower oxidation-reduction potential works as an anode, and an oxidation reaction occurs on the surface of the anode and this electrode ionizes and melts. On the other hand, an electrode at a higher oxidation-reduction potential works as a cathode, and a reduction reaction of water occurs on the side of the cathode and hydrogen is generated.

When the laminated structure of the Cr—Mo alloy layer and the pure Cr layer is dipped in an etching liquid for Cr, a galvanic cell is formed by the Cr—Mo alloy layer and the pure Cr layer, and oxidation-reduction reactions occur in the portions of the respective layers which are in contact with the etching liquid, so that a galvanic current flows at the interface between both layers which are laminated. In the Cr etching liquid, since the corrosion potential of the Cr—Mo alloy layer is about 20 mV lower than that of the pure Cr layer, the Cr—Mo alloy layer and the pure Cr layer serve as the anode and the cathode, respectively, so that a galvanic current flows across both layers.

In each of the Cr—Mo alloy layer and the pure Cr layer, an oxidation reaction called etching naturally occurs as shown by, for example, either of the following formulae (1) or (2):

$$Cr \rightarrow Cr^{3+} + 3e \qquad (1),$$

$$MO \rightarrow MO^{3+} + 3e \qquad (2).$$

On the side of the Cr—Mo alloy layer which serves as the anode, the oxidation reactions, i.e., the etching reactions shown by the formulae (1) and (2) are accelerated. On the other hand, on the side of the pure Cr layer which serves as the cathode, normally, hydrogen gas due to the reduction reaction of water occurs, but, in addition, the etching reaction which involves the oxidation reaction of Cr shown by the formula (1) occurs. In this cage, the etching reaction of Cr is restrained by partly reducing Cr ions as shown by the following formula (3):

$$Cr^{3+} + 3e \rightarrow Cr \qquad (3).$$

The above-described electrochemical reactions start at the moment when the etching of the Cr—Mo alloy layer, which is the upper, layer is completed and both the underlying pure Cr layer and the overlying Cr—Mo alloy come into contact with the etching liquid. That is to say, upon the completion of the etching of the Cr—Mo alloy layer in the direction of the thickness thereof, the side etching of the overlying Cr—Mo alloy layer is accelerated. As a result, the portion of the Cr—Mo alloy layer which is in the vicinity of the interface is etched fastest and is retracted.

Since the portion of the underlying pure Cr which is closer to the interface comes into contact with the etching liquid earlier, the etching liquid penetrates into that portion and the etching of the Cr layer proceeds. Accordingly, etching retraction proceeds faster in the portion of the underlying pure Cr layer which is closer to the interface with the Cr—Mo alloy layer, thereby working the side end face into a right-tapered shape.

The potential difference between the Cr—Mo alloy layer and the pure Cr layer is the largest at the interface of the laminated film, and as the distance from the interface becomes larger, the potential difference becomes smaller. Accordingly, since the oxidation reaction of the Cr—Mo alloy layer of the upper layer becomes smaller toward the top (resist) side of the same, the side etching rate of the Cr—Mo alloy layer becomes smaller. Therefore, the side end edge of the Cr—Mo alloy layer is formed into a slightly counter-tapered or nearly perpendicular shape.

The cross-sectional shape of a simple lamination of a pure Cr layer and a Cr—Mo alloy layer is normally determined by the relationship between (1) the magnitude of the side etching rate of the upper layer and (2) the magnitude of the side etching rate of the lower layer, and the present invention makes it possible to control the side etching of the interface (3) by adding a corrosion potential conditioning liquid to the etching liquid, in addition to the above-described items (1) and (2). If the etching liquid is ceric ammonium nitrate, nitric acid is suitable as the corrosion potential conditioning liquid.

In conventional practice, particularly in the case of a single layer, the side etching rate (1) is determined by the penetration of the etching liquid into the interface between the resist and the film, and the side etching rate (2) is determined by the side etching rate of the film itself and the side etching rate of the interface of a bed. In the case (1), the penetration of the etching liquid into the interface between the resist and the film greatly depends on the adhesion between the resist and the film, so that as the size of a display screen becomes larger, it becomes more difficult to uniformly control the adhesion to the resist. In other words, the side etching rate becomes larger at a location of smaller adhesive force. Therefore, the taper shape becomes non-uniform within the substrate.

On the other hand, in accordance with the present invention, by introducing the item (3) in addition to the items (1) and (2), it is possible to control the taper shape by means of only the oxidation reduction potentials of laminated materials. Accordingly, even in the case (1) where the in-plane distribution of the adhesion to the resist is large, the influence thereof can be completely eliminated and the cross-sectional shape of the laminated layer can be uniformly controlled in its plane irrespective of the area of the substrate.

FIG. 7 is an explanatory diagram of the result of a change measured by changing the content of Mo in the corrosion potentials of pure Cr and a Cr—Mo alloy in an aqueous solution of ceric nitrate. The corrosion potential is at 1,100 mV for the pure Cr, that is, when the Mo content is 0, and at 1,080 mV for an Cr—Mo alloy containing 50 wt. of Mo, that is, a Cr-50 Mo alloy. By making use of the potential difference between the two, it is possible to effect the taper-etching shown in FIG. 4. Incidentally, the corrosion potential of the pure Mo is as low as 360 mV so that the corrosion potential of the Cr—Mo alloy becomes lower for a higher Mo content.

FIG. 8 is an explanatory diagram of a change in a taper angle when the composition of the Cr—Mo alloy to be combined with the pure Cr is changed. When the Mo content is 0, as shown, that is, in the case of pure Cr, the wiring line is made of Cr alone so that the taper angle becomes 90 degrees (or normal to the substrate face). In the case of Cr-50 Mo, the taper angle becomes about 60 degrees. As the taper angle becomes lower, the coverage of the CVD film and the wiring film becomes better, but the amount of side-etching becomes larger and the accuracy of patterning becomes lower. Accordingly, the taper angle is selected from the range of 10–60 degrees as required.

According to the present invention based on the technical items thus far described, by adding a corrosion potential conditioning liquid to the etching liquid, it is possible to control the side-etching of the interface and also to greatly improve the distribution of the taper angle in the substrate face. If the etching liquid is ceric ammonium nitrate, nitric acid is suited to the corrosion potential conditioning liquid.

In the tapering case making use of the penetration of the etching liquid into the clearance between the photoresist and the metallic thin film, the taper angle may be dispersed so largely, reflecting the interface dispersion of the adhesion between the photoresist and the metallic thin film, as to be doubled between the central portion and the peripheral portion. In contrast, in the case of the present invention, the aforementioned corrosion potential difference is determined by the material being employed. According to the present invention, making use of the potential difference between the upper layer film and the lower layer film, therefore, the in-face dispersion of the taper angle of the etching treatment can be limited to within 79%.

FIG. 9 is an explanatory diagram of a change in corrosion potential with respect to the amount of $HNO_3$ to be added to ceric ammonium nitrate. In FIG. 9, symbol A represents the case of pure Cr, symbol □ represents the case of Cr-30 Mo, and symbol ◊ represents the case of Cr-50M. Incidentally, the corrosion potential is based on the corrosion potential of Ag—AgCl. FIG. 9 shows that the corrosion potential is high in the case of pure Cr, but is low in either of the cases of Cr-30Mo and Cr-50Mo.

FIGS. 10(a) and 10(b) are explanatory diagrams showing a change in galvanic current with respect to the amount of $HNO_3$ to be added to ceric ammonium nitrate. FIG. 10(a) shows a change in galvanic current for the example of pure Cr and Cr-30Mo, while FIG. 10(b) shows a change in galvanic current for the example of pure Cr and Cr-50Mo. As can be seen from FIGS. 10(a) and 10(b), as the amount of added nitric acid increases, the galvanic current increases, that is, the corrosion potential difference, between the pure Cr and the Cr—Mo alloy increases.

FIGS. 11(a) and 11(b) are an explanatory diagrams showing a change in galvanic voltage with respect to the amount of $HNO_3$ to be added to ceric ammonium nitrate. FIG. 11(a) shows a change in galvanic voltage for the example of pure Cr and Cr-30Mo, while FIG. 11(b) shows a change in galvanic voltage for the example of pure Cr and Cr-50Mo. As can be seen, as the amount of added nitric acid increases, the galvanic voltage difference, that is, the corrosion potential difference, between Cr and the Cr—Mo alloy increases. If a counter electrode is made of Cr and a sample electrode is made of a Cr—Mo alloy and both electrodes are short-circuited and dipped in an identical test solution, a galvanic current which compensates for a galvanic potential flows between the electrodes, and the corrosion potential difference between the electrodes takes on a nearly middle value between the corrosion potential of Cr and the corrosion potential of the Cr—Mo alloy. The corrosion potential difference increases as the amount of nitric acid added increases.

FIG. 12 is an explanatory diagram showing changes in the taper angles of the etched side ends of different laminated films with respect to the amount of $HNO_3$ to be added to ceric ammonium nitrate. In FIG. 12, symbol ◇ represents the taper angle of a laminated film of Cr/Cr-30Mo, while symbol □ represents the taper angle of a laminated film of Cr/Cr-50Mo. As shown in FIG. 12, whether the laminated film is Cr/Cr-30Mo or Cr/Cr-50Mo, the taper angle of its etched side end to which the corrosion potential conditioning liquid ($HNO_3$) is not added does not fall below 60° with respect to the substrate.

In contrast, if the corrosion potential conditioning liquid ($HNO_3$) is added by 5 vol. %, the respective taper angles for Cr/Cr-30Mo and Cr/Cr-50Mo become 56° and 48°. If the amount of the corrosion potential conditioning liquid ($HNO_3$) to be added is 10 vol. %, the respective taper angles for Cr/Cr-30Mo and Cr/Cr-50Mo become 52° and 46°; if the amount to be added is 20 vol. %, the respective taper angles become 48° and 44°; and if the amount to be added is 40 vol. %, the respective taper angles become 45° and 45°. If the amount to be added is 60 vol. %, the respective taper angles become 16° and 15°.

The phenomenon of a decrease in taper angle is caused by the above-described electrochemical reaction in the concentration range of 0 vol. % to 40 vol. %, and, in a concentration range exceeding 40 vol. %, the effect of nitric acid having a strong osmotic force penetrating into a resist/thin film interface and accelerating etching at the interface and the effect of the above-described electrochemical reaction are combined to reduce the taper angle abruptly.

Although the technique of carrying out tapering by addition of nitric acid has heretofore been known, this prior technique utilizes only the strong osmotic force of nitric acid against a resist/thin film interface, but does not intend to use nitric acid as a corrosion potential conditioning liquid. The present invention is characterized by the use of nitric acid as a corrosion potential conditioning liquid. By adding the corrosion potential conditioning liquid to the etching liquid in this manner, it is possible to form a taper angle of 60° or less.

FIGS. 13(a) and 13(b) are views copied from images obtained by photographing, with a scanning electron microscope, the states of etching of different Cr/Cr—Mo laminated films when only ceric ammonium nitrate was used as an etching liquid. FIG. 13(a) shows the state of etching of a section of a Cr/Cr-30Mo laminated film, while FIG. 13(b) shows the state of etching of a section of a Cr/Cr-50Mo laminated film. In each of FIGS. 13(a) and 13(b), symbol SUB denotes a substrate, and symbol R denotes a resist.

FIGS. 14(a) and 14(b) are views copied from images obtained by photographing, with a scanning electron microscope, the states of etching of different Cr/Cr—Mo laminated films when 10 vol. % of nitric acid ($HNO_3$) as a corrosion potential conditioning liquid was added to ceric ammonium nitrate serving as an etching liquid. FIG. 14(a) shows the state of etching of a section of a Cr/Cr-30Mo laminated film, while FIG. 14(b) shows the state of etching of a section of a Cr/Cr-50 Mo laminated film. In FIG. 14, symbol SUB denotes a substrate, and symbol R denotes a resist.

As is apparent from a comparison between FIGS. 13(a) and 13(b) and 14(a) and 14(b), in the examples shown in FIGS. 13(a) and 13(b), neither of the taper angles of the etched side ends falls below 60°; however, in the examples shown in FIGS. 14(a) and 14(b), the corrosion potential difference between the bed film Cr and the upper film Cr—Mo increases due to the action of the corrosion potential conditioning liquid, and the electrochemical reaction is accelerated, whereby the respective taper angles of the etched side ends of the examples of FIGS. 14(a) and FIG. 14(b) become as small as 52° and 46°.

FIGS. 15(a) and 15(b) are views copied from images obtained by photographing, with a scanning electron microscope, the states of etching of different Cr/Cr—Mo laminated films when 60 vol. % of nitric acid ($HNO_3$) as a corrosion potential conditioning liquid was added to ceric ammonium nitrate serving as an etching liquid. FIG. 15(a) shows the state of etching of a section of a Cr/Cr-30Mo laminated film, while FIG. 15(b) shows the state of etching of a section of a Cr/Cr-50Mo laminated film.

In the examples shown in FIGS. 15(a) and 15(b), the respective taper angles of the etched side ends become as small as 16° and 15° by the action of penetration of nitric acid ($HNO_3$) into the resist/Cr—Mo thin film interface, in addition to the acceleration effect of the corrosion potential conditioning liquid on the electrochemical reaction. When the taper angle of the etched side end of each of the laminated films was 45° or less, the taper angle of the overlying Cr—Mo alloy layer was a right-taper angle.

As described above, according to the present invention, by adding the corrosion potential conditioning liquid to the etching liquid, it is possible to make the taper angle of the etched side end with the substrate as small as 60° or less, thereby enabling a thin film electrode wiring of good step coverage. When the present invention is applied to the formation of a gate wiring line in an inverted stagger type TFT, the step coverage of an insulating film (or gate insulating film), an a-Si semiconductor film or a drain wiring line of SiN or the like to be formed over the gate wiring line is improved so as to raise the breakdown voltage and to reduce the percentage of defects, such as disconnection of the drain wiring line. Moreover, the upper layer containing the added Mo is hard to remain a fluoride and to oxidize in an oxidizing atmosphere, even when dry-etched with a fluorine-containing gas, so that its contact with another over electrode can be maintained satisfactorily.

Any agent liquid other than nitric acid that can condition a corrosion potential difference may be used as the corrosion potential conditioning liquid. For example, if hydrogen peroxide-containing water or perchloric acid is added to an aqueous solution of ceric ammonium nitrate, the corrosion potential difference between Cr and Cr—Mo can be conditioned so that the taper angle of the etched side end of the laminated film can be made 60° or less.

BRIEF DESCRIPTION OF THE DRAWINGS

FIG. 19 is a graph showing the relationship between the taper angle of an etched side end edge of a laminated film and the insulation breakdown electric field of an insulating film which is an upper layer of the laminated film.

DESCRIPTION OF THE PREFERRED EMBODIMENT

The present invention will be described below in detail with reference to its embodiment.

Figure 1:
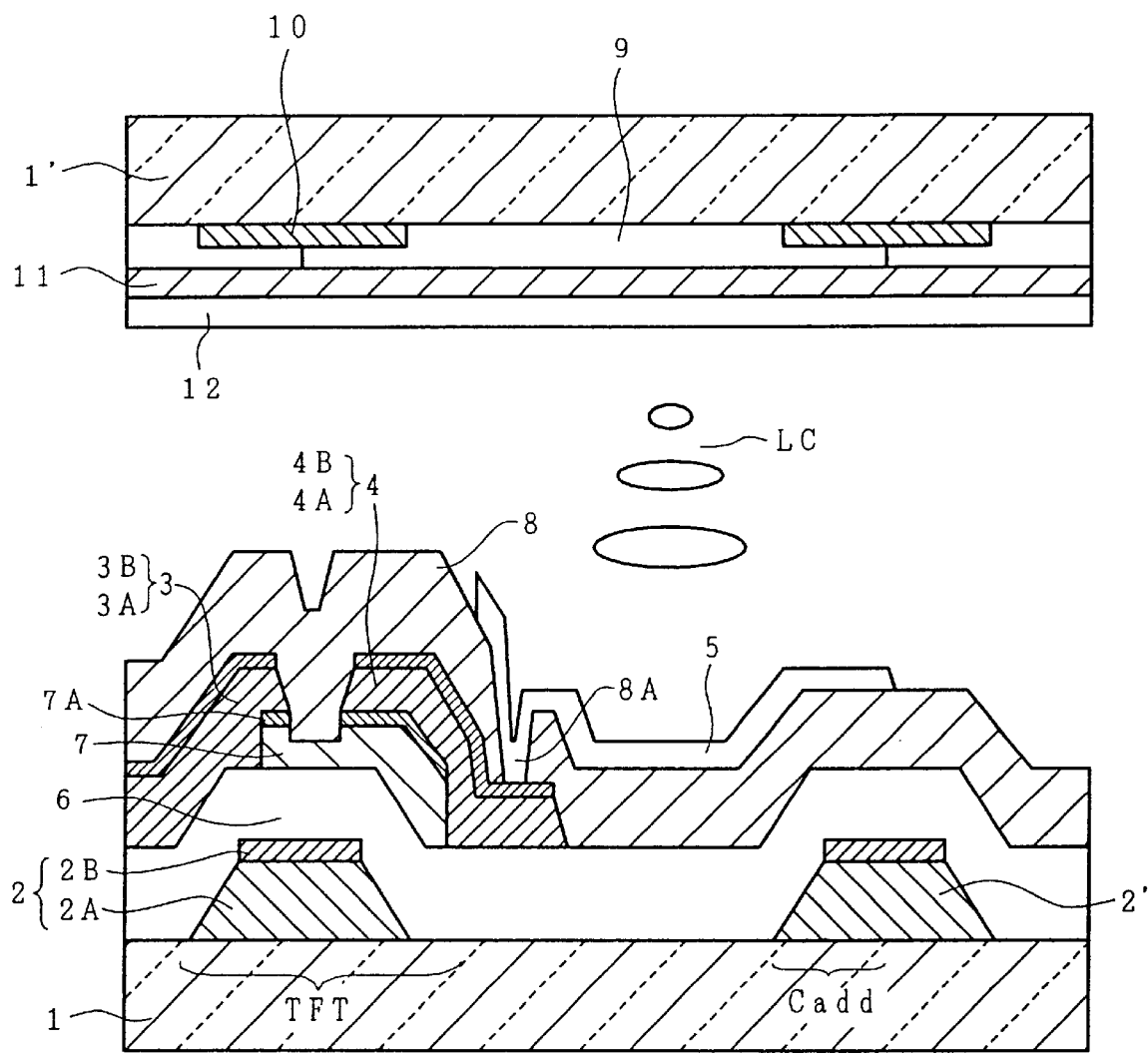
FIG. 1 is a partial section view showing an essential structure of a liquid crystal display device according to the present invention.
Figure 2:
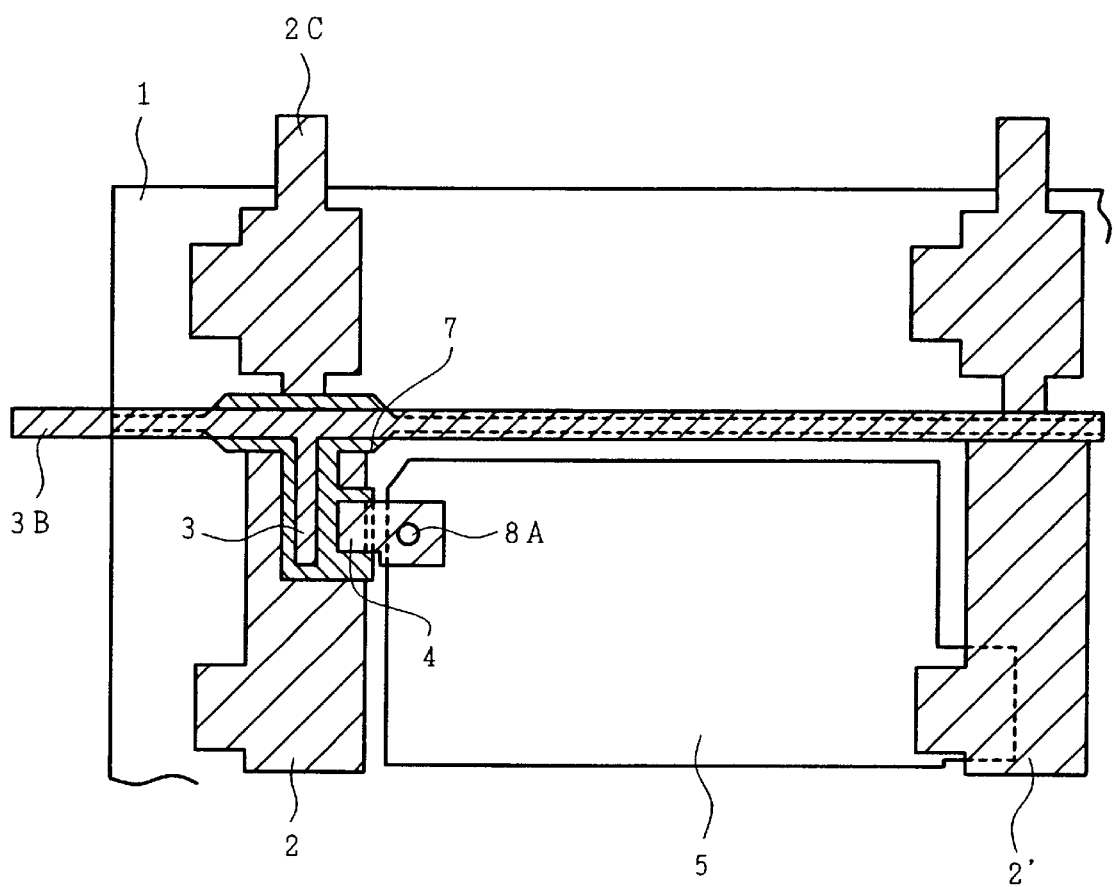
FIG. 2 is a partial top plan view showing an essential structure of the liquid crystal display device according to the present invention.
Figure 11A:
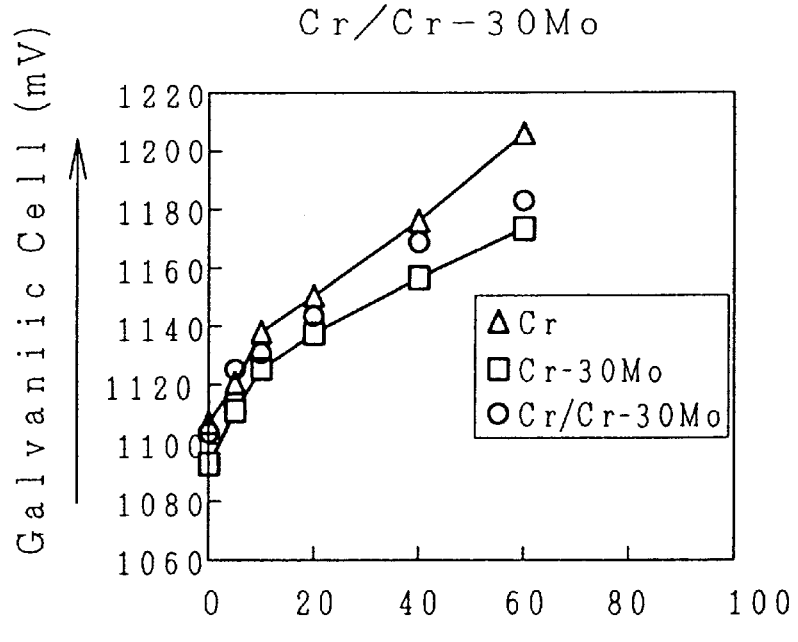
FIGS. 11(a) and 11(b) are graphs showing a change in galvanic current with respect to the amount of $HNO_3$ to be added to ceric ammonium nitrate.
Figure 11B:
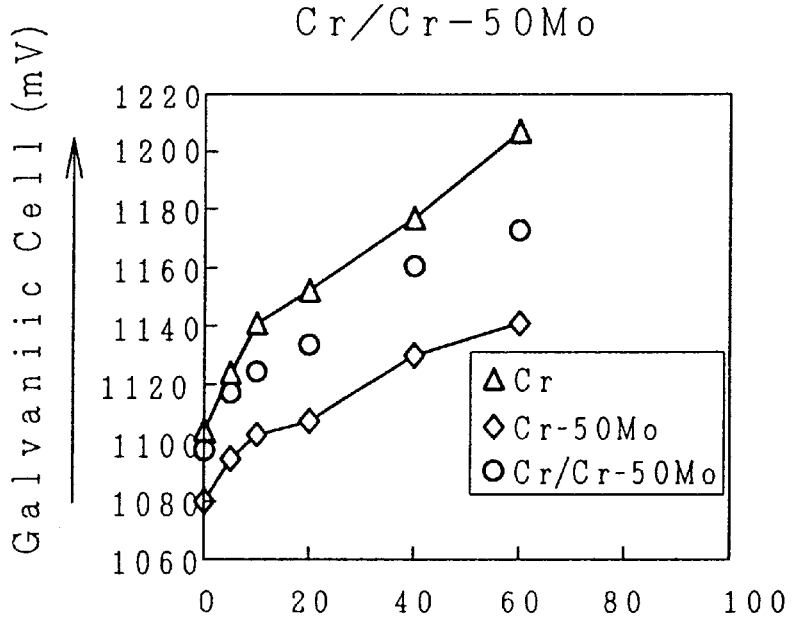
Figure 12:
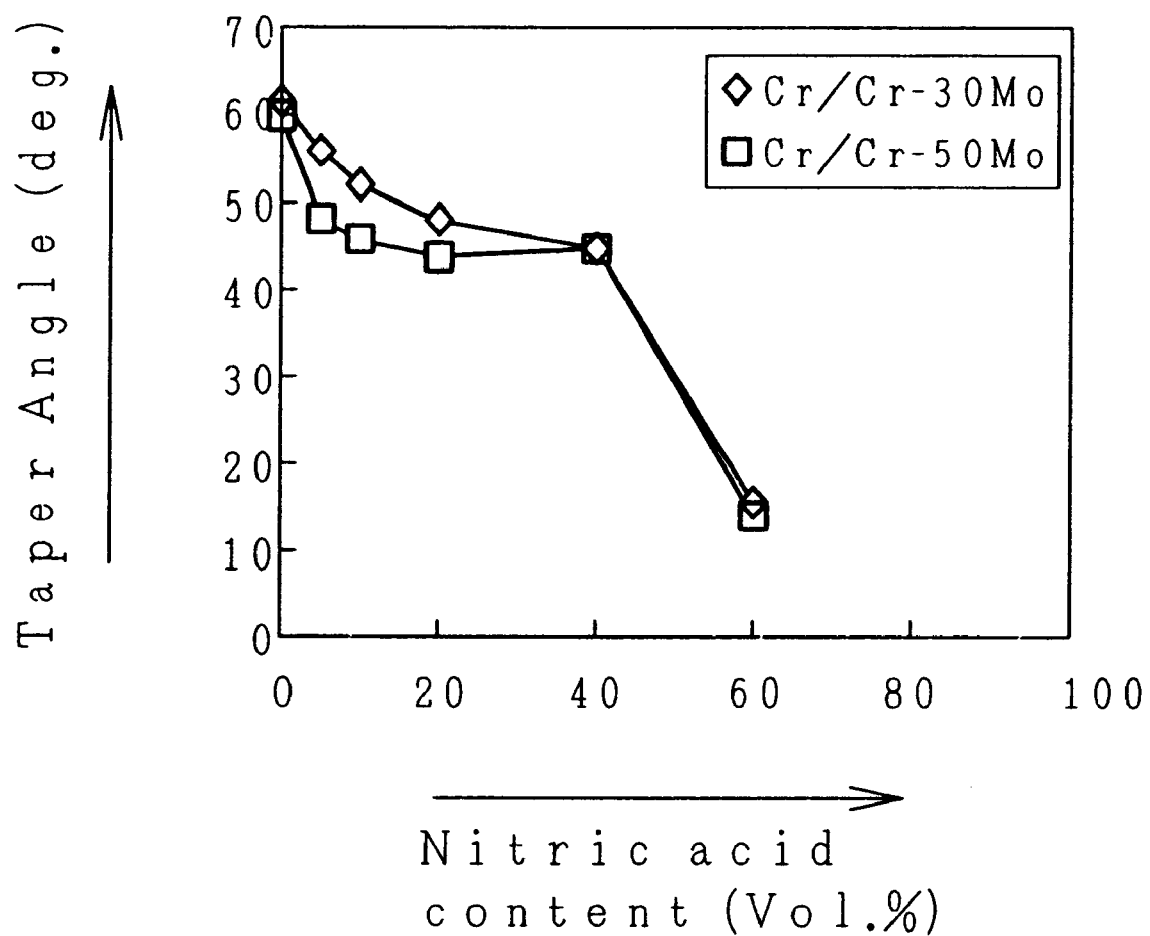
FIG. 12 is a graph showing changes in the taper angles of the etched side ends of different laminated films with respect to the amount of $HNO_3$ to be added to ceric ammonium nitrate.
Figure 13A:
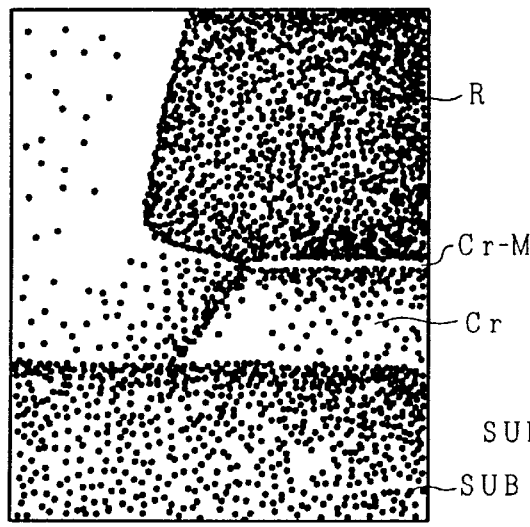
FIGS. 13(a) and 13(b) arc views copied from images obtained by photographing, with a scanning electron microscope, the states of etching of different Cr/Cr—Mo laminated films when only ceric ammonium nitrate was used as an etching liquid.
Figure 13B:
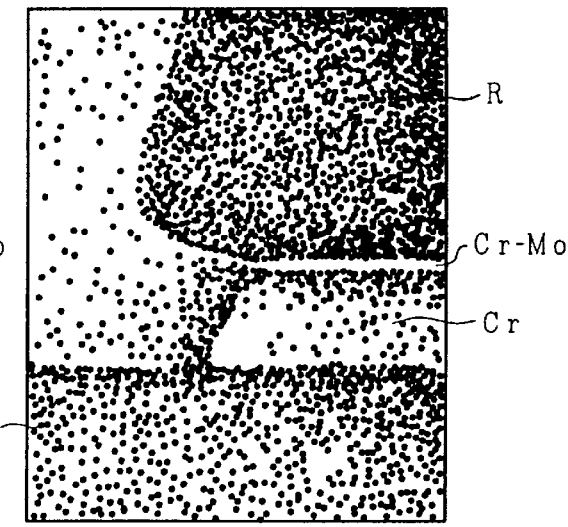
Figure 14A:
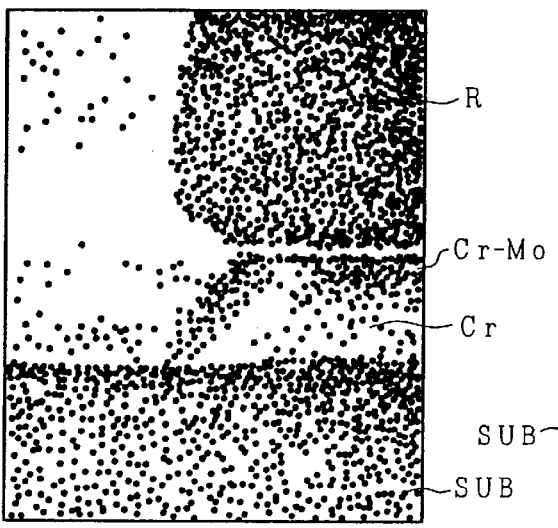
FIGS. 14(a) and 14(b) are views copied from images obtained by photographing, with a scanning electron microscope, the states of etching of different Cr/Cr—Mo laminated films when 10 vol. % of nitric acid ($HNO_3$) as a corrosion potential conditioning liquid was added to ceric ammonium nitrate serving as an etching liquid.
Figure 14B:
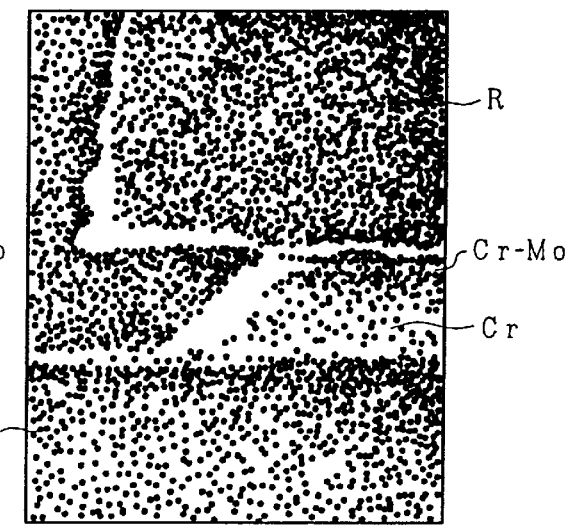
Figure 15A:
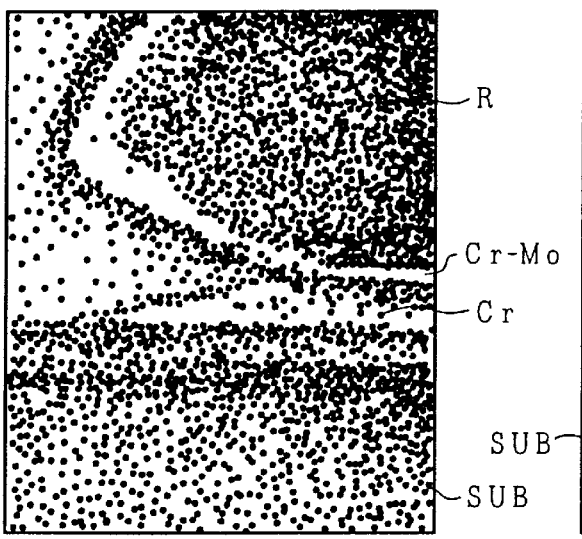
FIGS. 15(a) and 15(b) are views copied from images obtained by photographing, with a scanning electron microscope, the states of etching of different Cr/Cr—Mo laminated films when 60 vol. % of nitric acid ($HNO_3$) as a corrosion potential conditioning liquid was added to ceric ammonium nitrate serving as an etching liquid.
Figure 15B:
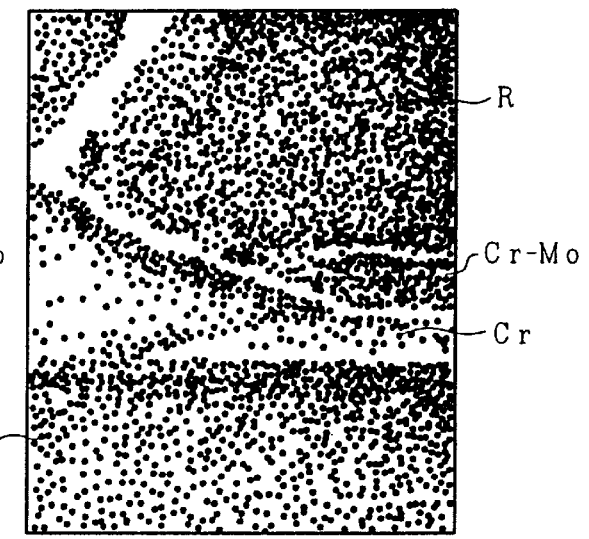
Figure 16:
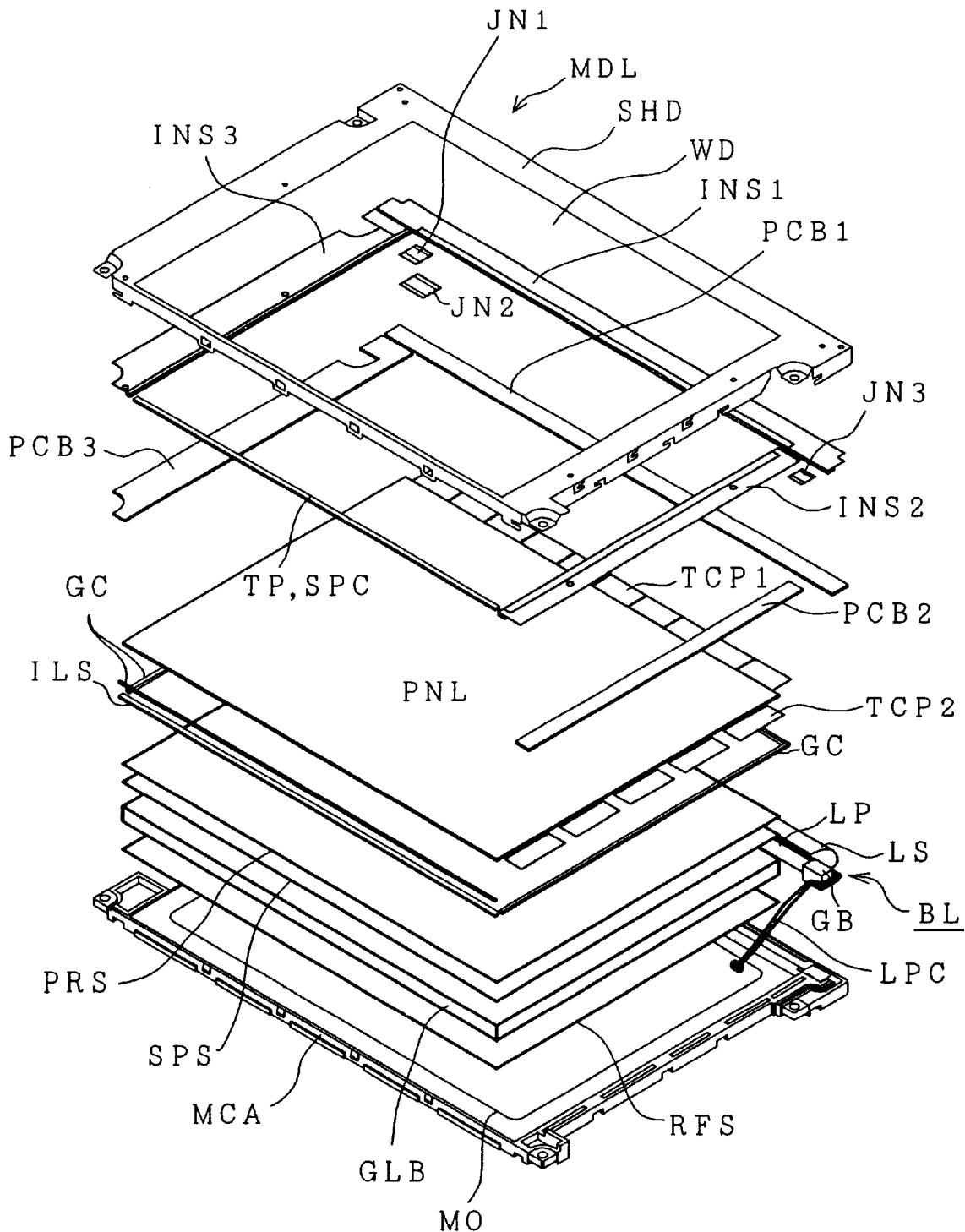
FIG. 16 is an exploded perspective view showing the general structure of an active matrix type liquid crystal display device using an alignment film according to the present invention.
Figure 17:
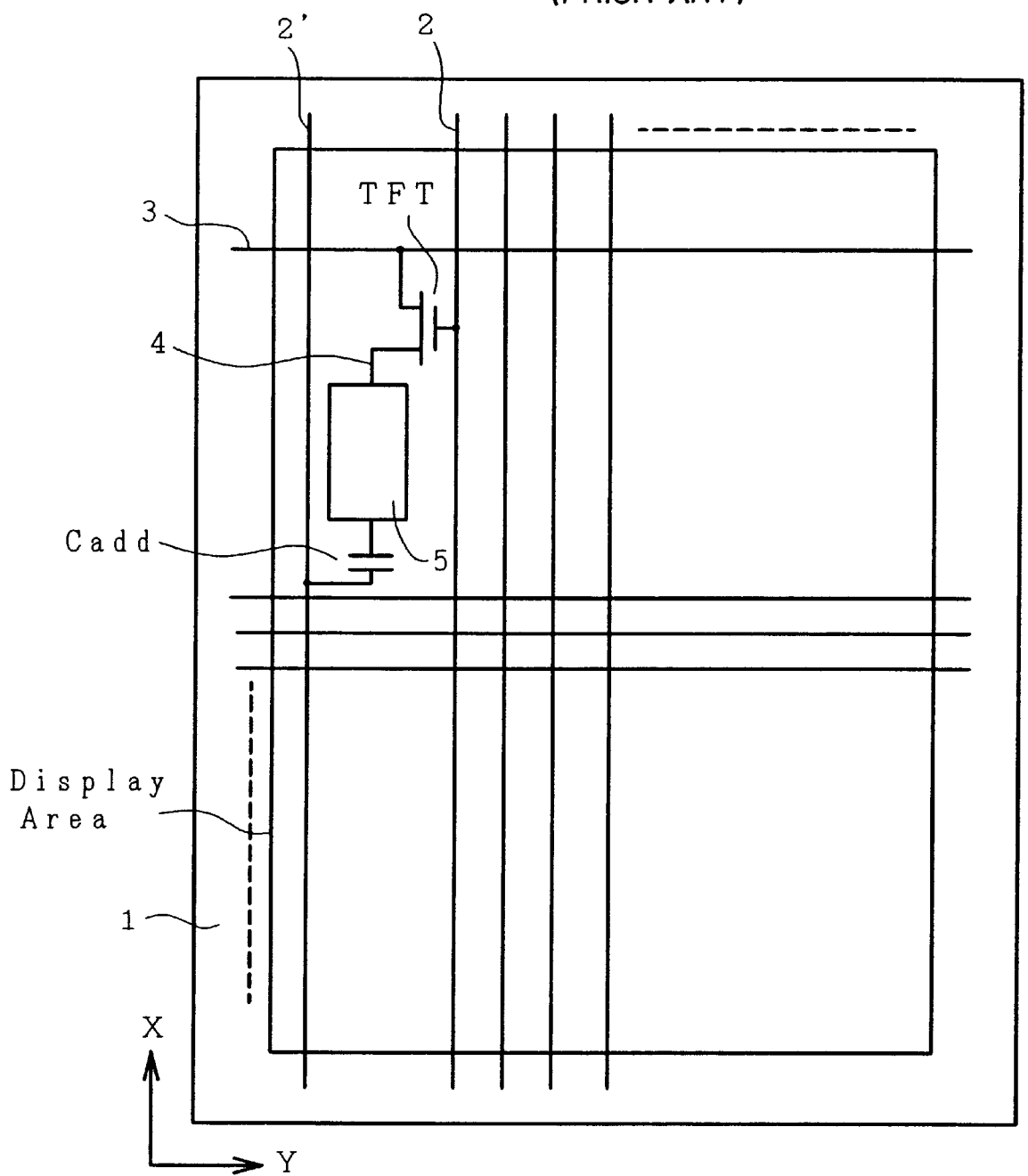
FIG. 17 is a schematic diagram showing the wired structure in the vicinity of one pixel of a TFT substrate which forms part of the liquid crystal display device shown in FIG. 16.
Figure 18:
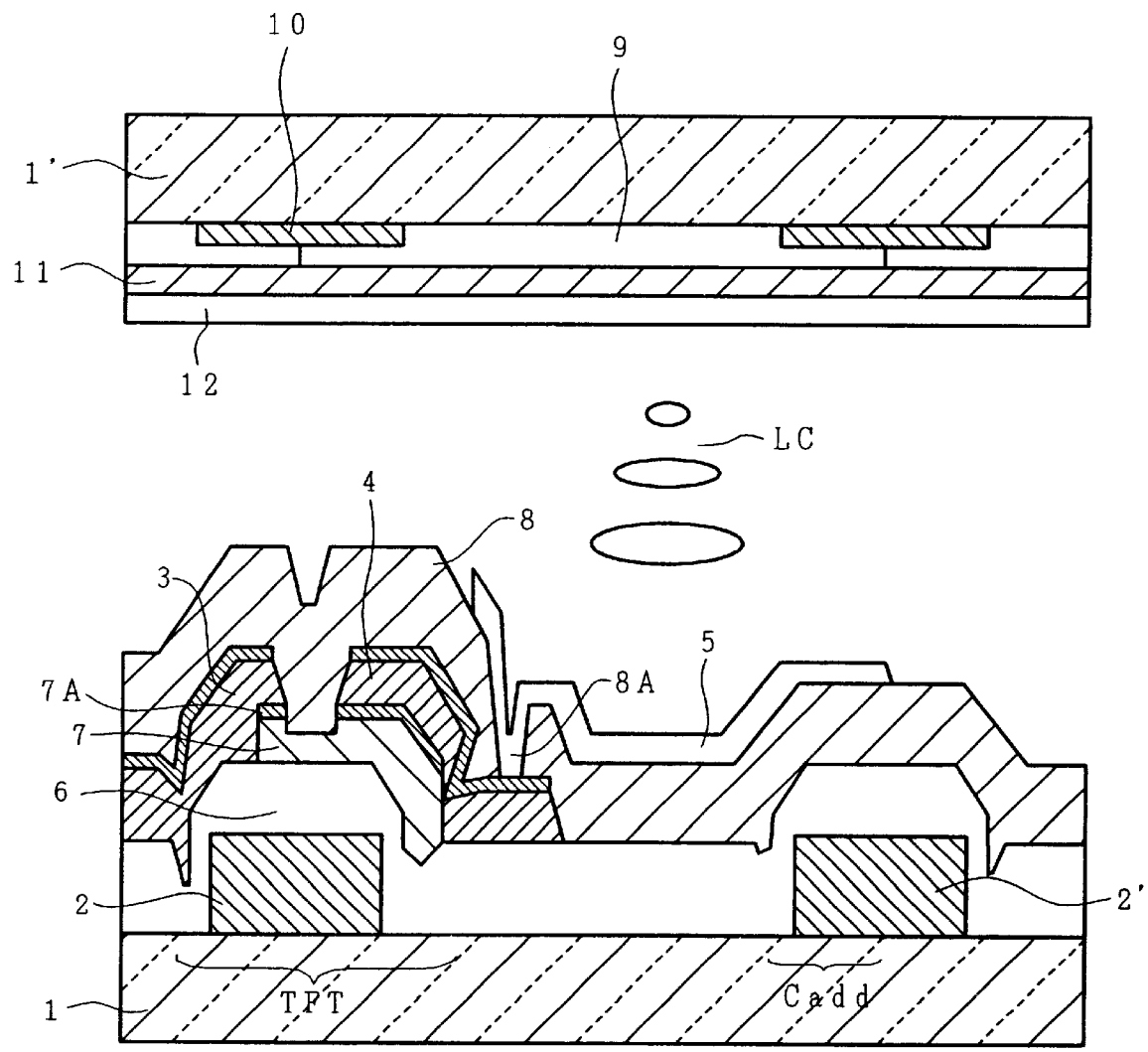
FIG. 18 is a partial section view showing the structure in the vicinity of the TFT in a liquid crystal display device of the prior art.

FIG. 1 is a partial section showing an essential feature of a liquid crystal display device according to the present invention, and FIG. 2 is a partial plan view of the same. As seen in FIG. 11, the display device comprises a TFT substrate 1; a filter substrate 1'; a scanning signal line (gate line (electrode)) 2; a video signal line (drain line (electrode)) 3; a source line (electrode) 4; a pixel electrode 5; an insulating film 6; a semiconductor layer 7; a contact layer 7A; a protective film 8; a contact hole 8A; a color filter 9; a black matrix 10; a smoothing layer 11; a common electrode 12; a thin film transistor TFT; a capacity added element Cadd; a liquid crystal LC. Moreover, reference numerals 3A and 3B and 4A and 4B designate the laminated portions of a Cr—Mo alloy layer and pure Cr forming the drain electrode 3, and the source electrode 4, respectively. Reference numerals 2A and 2B designate a first layer (or lower layer) and a second layer (or upper layer) forming the gate electrode 2.

With regard to the gate electrode 2, the lower layer 2A is a pure Cr layer, whereas the upper layer 2B is a Cr—Mo alloy layer. Moreover, the lower layer 2A has a thickness of 180 nm, whereas the upper layer 2B has a thickness of 20 nm, and the side end face of the wiring line is mostly right-tapered 60° or less in a satisfactory manner. Here, the side end face of the upper layer 2B is shaped vertically relative to the substrate face, as shown in FIG. 1, but is of uniform thickness so that the entire wiring line exerts no substantial influence on the right-tapered shape.

Since the gate signal line 2 is thus given a laminated structure, having a first layer of pure Cr satisfactorily right-tapered, it is possible to prevent the drain electrode 3 and the source electrode 4 which are formed thereover from being broken and to avoid the disadvantage that either cracks or pinholes are formed in the insulating film 6. Since the lower layer in contact with the substrate is made of pure Cr, moreover, the adhesion between the gate electrode 2 and the substrate can be enhanced to prevent the separation of the wiring line due to thermal stress or the like.

All over the surface of the substrate 1 on which the gate electrodes 2 are formed, there is formed a silicon nitride (SiN) insulating film 6 for effecting the layer insulation between the gate electrode 2, and the drain electrode 3 and the source electrode 4, as will be described hereinafter. Over the insulating film 6 at one corner of the pixel region, which is defined by the gate electrode 2, the drain electrode 3 and the source electrode 4, moreover, there is formed the thin film transistor TFT. In the region where this thin film transistor TFT is formed, there is formed above the insulating film 6 and on the surface of the insulating film 6, located over the gate electrode 2, a semiconductor layer 7 which is made of amorphous silicon (a-Si) crossing the gate electrode 2. Moreover, this semiconductor layer 7 is formed to act as the lower layer of the region forming the source electrode 4. The laminated structure of the source electrode 4 over the semiconductor layer 7 is provided for preventing benching and for reducing the capacity between itself and the intersecting gate electrode 2.

On the surface of the semiconductor layer 7 in the region forming the thin film transistor TFT, there are formed the drain electrode 3 and the source electrode 4, which are arranged to confront each other through the gate electrode 2, as viewed in a top plan view. Here, in the interface of the surface of the semiconductor layer 7 with the drain electrode 3 and the source electrode 4, there is formed the contact layer 7A which is made by doping the semiconductor layer 7 with an impurity of high concentration. This highly doped impurity layer is formed all over the semiconductor layer 7, when this layer 7 is formed, by etching the impurity layer, as exposed from the electrodes 3 and 4 to be formed later, by using the electrodes 3 and 4 as masks. Moreover, the drain electrode 3 and the source electrode 4 are formed at the same step and of the same material. This material is exemplified by a laminated wiring line shared with the gate electrode 2. Another example may be a single alloy layer of Cr and Mo.

As shown in FIG. 2, on the other hand, the source electrode 4 extends to the region where the pixel electrode 5 is formed and makes contact with the pixel electrode 5 at this extension. Here, the source signal line 4 is made of the material shared with the drain electrode 3 and is formed of the laminated structure of the layers 3B and 4B of the Cr—Mo alloy and the layers 3A and 4A of Cr. Incidentally, the alloy layer of Cr and Mo is not limited to either of the above-described Cr-30Mo and Cr-50Mo. All over the surface of the substrate 1 thus worked, there is formed a protective film 8 which is made of silicon nitrate (SiN), for example, so as to avoid the direct contact of the liquid crystal with the thin film transistor TFT. In this protective film 8, there is formed the contact hole 8A for exposing a portion of the extension of the source electrode 4.

In the pixel region in the upper face of the protective film 8, moreover, there is formed of the pixel electrode 5 which is made of an ITO film, for example. This pixel electrode 5 can be electrically connected with the source electrode 4 through the contact hole 8A. In this case, the pixel electrode 5 is partially extended to another adjoining gate line (electrode) 2' which is different from the gate line (electrode) 2 for driving the thin film transistor TFT. As a result, a capacity added layer Cadd is constructed of a dielectric film of the laminated structure which is composed of the insulating film 6, which is sandwiched between the pixel electrode 5 and the adjoining gate electrode 2, and the protective film 8.

Here, the substrate 1 thus having the various films is adhered through the liquid crystal LC to the other substrate (transparent substrate) 1', as shown in FIG. 1. The plural color filters 9, which are defined by the black matrix 10, and the common electrode 12, which is shared among the individual pixel regions through the smoothing layer 11 covering those color filters 9, are formed, such as by ITO, on the other side of the substrate 1' facing the liquid crystal LC.

With the construction thus far described, the disconnection and short-circuiting of the drain line (electrode) and the source line (electrode) can be reduced to provide a highly reliable liquid crystal display device.

One example of a process for manufacturing the liquid crystal display device according to the present invention will be described below with reference to FIGS. 3(a) to 3(c) and FIGS. 4(a) to 4(c), which are diagrams showing steps in a process for manufacturing the liquid crystal display device according to the present invention, and the same reference numerals as those of FIG. 1 and 2 correspond to common portions.

Figure 3A:
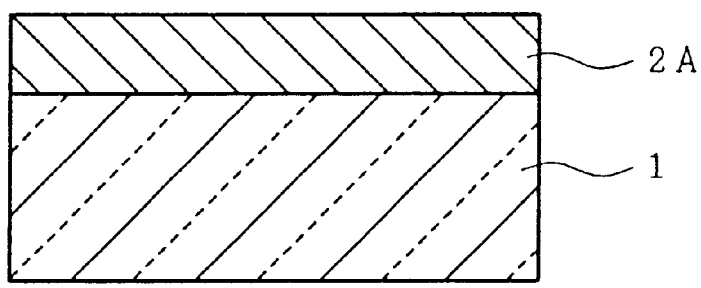
FIGS. 3(a) to 3(c) are diagrams showing steps in a process for manufacturing the liquid crystal display device according to the present invention.

First of all, the first layer (lower layer) 2A of pure Cr is formed (as shown in FIG. 3(a)) to have a thickness of 180 mm all over the principal surface of the glass substrate 1 by using a sputtering method or the like.

Figure 3B:
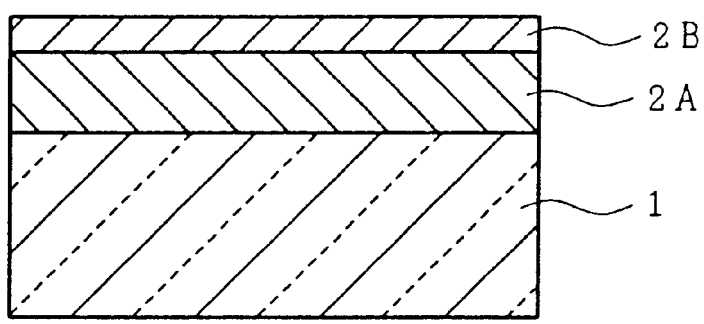

Next, a Cr-50Mo alloy layer is formed (as shown in FIG. 3(b)) to form the second layer (upper layer) 2B having a thickness of 20 nm over the first upper layer by a sputtering method or the like, thereby to form the laminated structure mainly for the Cr wiring line. This laminated structure provides the gate line (electrode) 2.

By reducing the content of Mo contained in the overlying Cr—Mo alloy to 50 wt. % or less, it is possible to improve resist adhesion without the use of a resist adhesion reinforcer based on a silicon coupler, such as hexamethyldisilazane, whereby it is possible to simplify the process without lowering patterning accuracy.

Figure 3C:
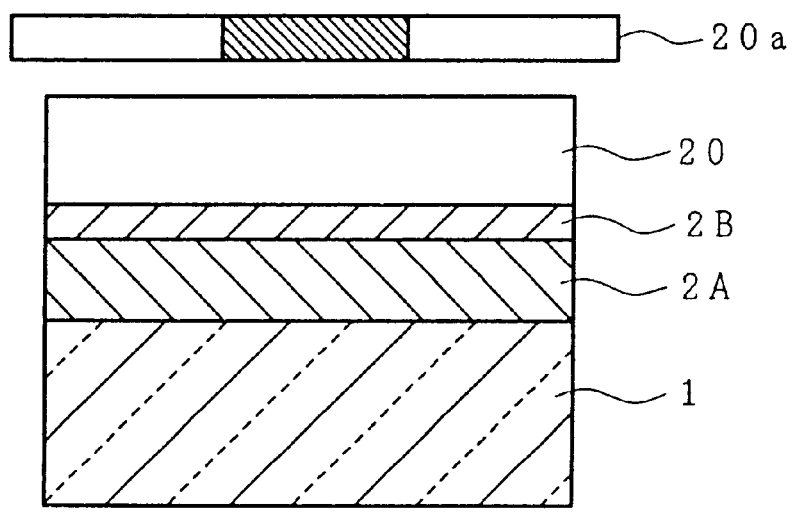

A photoresist 20 is applied (as shown in FIG. 3(c)) all over the upper face of the laminated structure and is selectively exposed through a photo mask 20a having a pattern of a gate electrode terminal 2C or the like of the thin film transistor TFT to be formed integrally with the gate electrode 2.

Figure 4A:
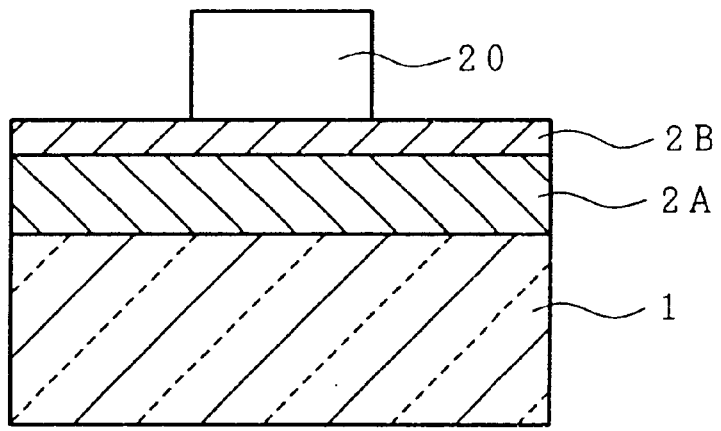
FIGS. 4(a) to 4(c) are diagrams showing steps subsequent to FIGS. 3(a) to 3(c) in the process for manufacturing the liquid crystal display device according to the present invention.

After that, the photoresist 20 is developed (as shown in FIG. 4(a)) to remove the portion corresponding to the regions, other than those to form the gate electrode 2, the gate electrode terminal 2C and so on, thereby to expose the laminated structure of the removed portion.

Figure 4B:
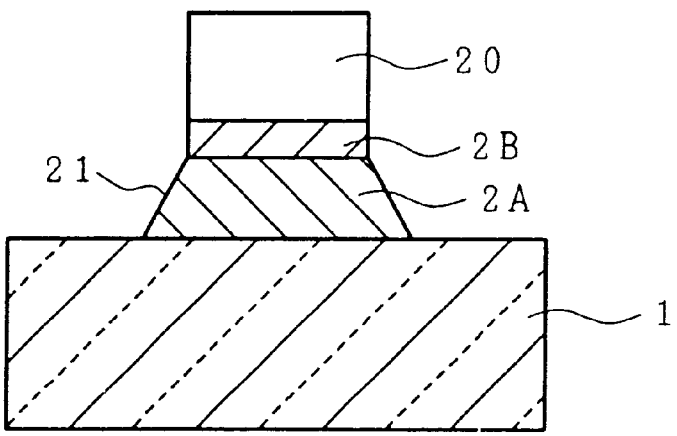

By using the residual photoresist 20 as the mask, the exposed laminated structure is dipped in an etching liquid for etching treatment. This etching liquid uses an aqueous solution of ceric ammonium nitrate to which nitric acid is added as a corrosion potential conditioning liquid. During this etching treatment, as described previously in connection with FIG. 7, the upper and lower layers forming the laminated structure have corrosion potentials of 1,080 mV and 1,110 mV, respectively, for the overlying Cr-50Mo alloy layer and the underlying pure Cr layer, so that a potential difference of 20 mV is established in-between. By adding nitric acid as a corrosion potential conditioning liquid, the electrochemical reaction is accelerated, as described previously with reference to FIGS. 9 to 12, and by making the corrosion potential of the upper layer lower than that of the lower layer, the upper layer having the lower corrosion potential can be etched (as shown in FIG. 4(b)) at a higher rate than the lower layer by an electrochemical reaction to give the two side end faces of the gate electrode 2 a satisfactory right-taper angle of 60° or less with respect to the substrate. At this time, since the side end faces of the upper layer are set at a right angle or are counter-tapered with respect to the substrate surface, it is desirable to make the upper layer thinner than the lower layer. For example, the upper layer is given a thickness of 20 nm, whereas the lower layer is given a thickness of 180 mm.

Figure 4C:
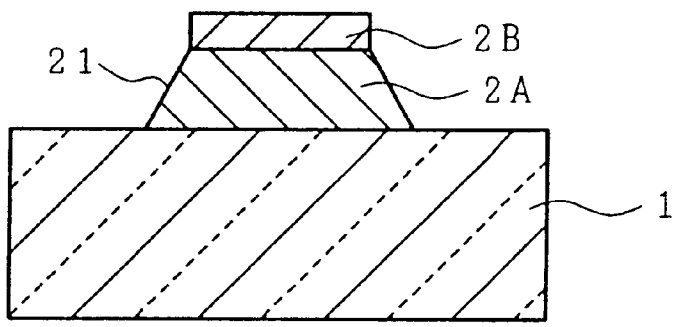
Figure 5:
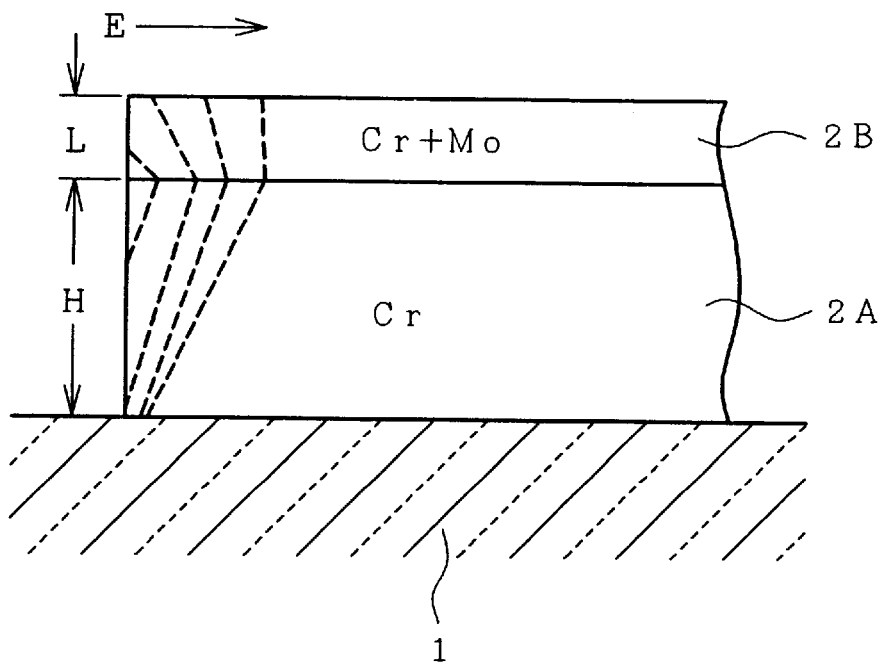
FIG. 5 is a diagram for explaining a state in which etching is carried out by an electrochemical reaction with a difference in the corrosion potential between an upper layer and a lower layer.
Figure 6:
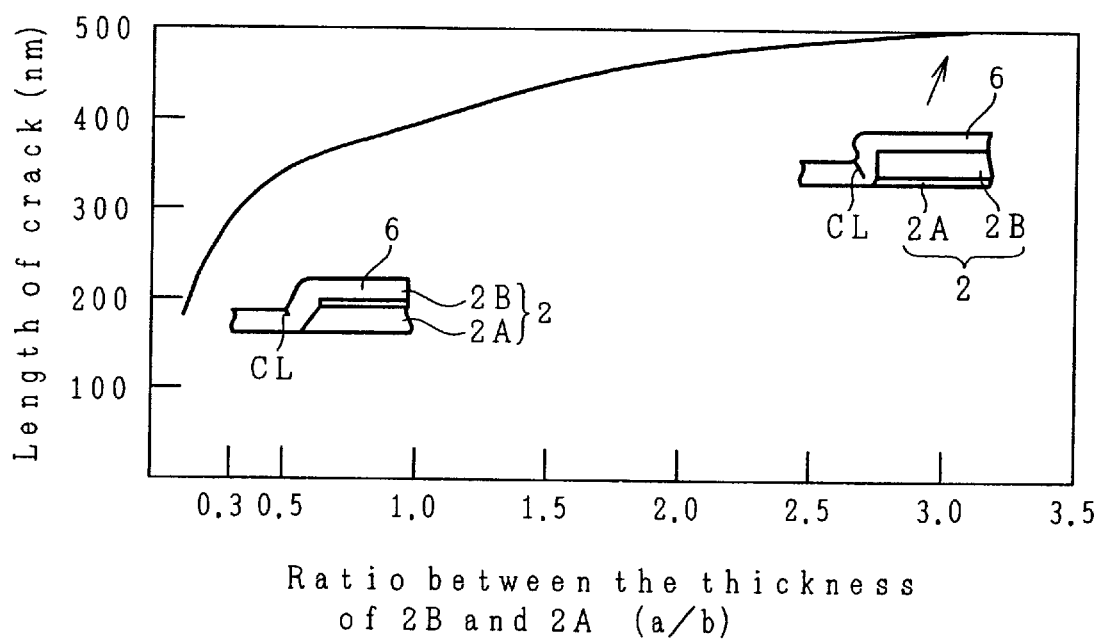
FIG. 6 is graph showing a change in the length of cracks which extend in a CVD film formed in a gate wiring portion when the thickness ratio between an upper layer and a lower layer is changed.

After the end of the etching treatment, the photoresist 20 is removed (as shown in FIG. 4(c)) to form the gate line 2, the gate line terminal 2C and so on with the laminated film which is left after the etching treatment.

The substrate 1 thus having the gate line 2 and the gate line terminal 2C formed by the aforementioned steps is worked to form the thin film transistor TFT by the following steps.

First of all, the substrate 1, having the gate line 2 and the gate line terminal 2C formed by the aforementioned steps, is provided all over its principal face, sequentially, with the insulating film 6 made of silicon nitride, the semiconductor layer 7 made of i-type amorphous Si (a-Si) and an amorphous Si semiconductor contact layer 7A doped with an n-type impurity, by using, for example, a CVD method.

In this case, the manufacturing process can be simplified by sequentially forming the insulating layer 6, the semiconductor layer 7 and the semiconductor contact layer 7A doped with the n-type impurity in a continuous manner. Since the gate line 2 shown in FIG. 1 is laminated in its entirety at this time, the coverage of the gate insulating film to be formed by the CVD over the gate line 2 is improved to avoid a defect in the gate insulating film and short-circuiting and disconnection between the drain line or the source line to be formed over the gate insulating film and the gate line.

Then, a photoresist film is applied to the whole area of the upper face of the semiconductor contact layer 7A doped with the n-type impurity, and the photoresist film is selectively exposed through the photomask having the pattern of the thin film transistor TFT.

After that, the photoresist film is developed to remove the portion other than the region for forming the thin film transistor TFT, thereby to expose at that removed portion the upper face of the semiconductor contact layer 7A which is doped with the n-type impurity.

The residual photoresist film is used as a mask to selectively etch the semiconductor contact layer 7A exposed from that mask, and the underlying semiconductor layer 7. In this case, the insulating film 6 located below the semiconductor layer 7 is left without being etched. As a result, in the region for forming the thin film transistor TFT, there arc sequentially formed the silicon nitride film for the gate insulating layer, the i-type amorphous Si semiconductor layer, and the amorphous Si semiconductor layer doped with the n-type impurity for the contact layer.

Below the source line 4 subsequently formed, there is formed the laminated structure of the semiconductor contact layer 7A doped with the n-type impurity, and the semiconductor layer 7.

All over the principal surface of the substrate 1 thus worked, moreover, there is formed the laminated structure of the Cr—Mo alloy layer and the pure Cr layer by a sputtering method, for example. This laminated structure selectively exposes the photoresist through the photomask which has the pattern including the source line 4, the drain line 3, the drain line terminal 3B and the like.

After that, the photoresist film is developed to remove the photoresist film corresponding to the regions other than those for forming the source line 4, the drain line 3, the drain fine terminal 3B and the like, thereby to expose the aforementioned alloy film at the removed portions.

By using the residual photoresist film as the mask, moreover, the alloy layer exposed from this mask is selectively etched. As a result, the source line 4, the drain line 3, the drain line terminal 3B and the like are formed from the remaining alloy layer.

Moreover, the semiconductor contact layer 7A which overlies the semiconductor layer 7 formed in the region to form the thin film transistor TFT and is doped with the n-type impurity is selectively etched by using the source line 4 and the drain line 3 as a mask. As a result, the semiconductor contact layer 7A which is left and doped with the n-type impurity is formed only in the interface for the semiconductor layer 7 between the source line 4 and the drain line 3 so that it functions as the semiconductor contact layer 7A.

Next, the protective film 8 of silicon nitride is formed by a plasma method, for example, all over the principal surface of the substrate 1 worked by the aforementioned individual steps. At this time, the side end edges of the source line 4 and the drain line 3 are wholly right-tapered profiling the shape of the underlying gate line 2. As a result, the step coverage by the protective film 8 can be improved to reduce defects such as pinholes at the riding portions of the gate line and the drain line at the protective film 8. Since the gate line and the drain line are worked to have right taper, moreover, the step on the surface at the portion to form the thin film transistor TFT is made gentle.

Moreover, a contact hole 8A is formed in the protective film 8. Simultaneously with this, openings are formed in both the protective film 8 formed over the drain line terminal 3B and the protective film 8 formed over the gate line terminal 2C.

The mask used for working the protective film 8 is employed as it is to perform the dry etching. As a result, the through-hole is formed in the insulating layer 6 to expose the surface of the substrate 1 at the gate line terminal 2C, the drain line terminal 3B and the desired region. When the through-hole is formed with the dry etching gas, the electrode surface is exposed to that gas during the over-etching time. Since this source line surface is made of a Cr—Mo alloy layer, less fluoride or chloride is formed than the case where a pure Cr layer is used, so that the contact characteristics with the overlying ITO film can be drastically improved.

All over the region of the surface of the substrate 1 thus worked, there is formed the ITO film. This ITO film is given a suitable thickness of 70 to 300 nm, as exemplified herein by 140 nm.

The photoresist film is formed all over the surface of the ITO film and is selectively exposed through the photomask having the pattern including the pixel electrode 5, the gate line, the drain electrode terminal and the like.

Then, the photoresist film is developed to remove the portion other than the regions for forming the pixel electrode 5, the individual gate lines and the drain line terminal. The residual photoresist mask is used as a mask to selectively etch the ITO film exposed from the mask. As a result, the pixel electrode 5 and so on are formed from the residual ITO film.

The substrate 1', as shown in FIG. 1, is adhered to the TFT substrate having the desired wiring lines and electrodes formed by the aforementioned individual steps, and the clearance in-between is filled with the liquid crystal LC to form the liquid crystal panel. On the face of the active film substrate in contact with the liquid crystal LC, although not shown, there is formed an alignment film for initially aligning the molecules of the liquid crystal LC.

Figure 7:
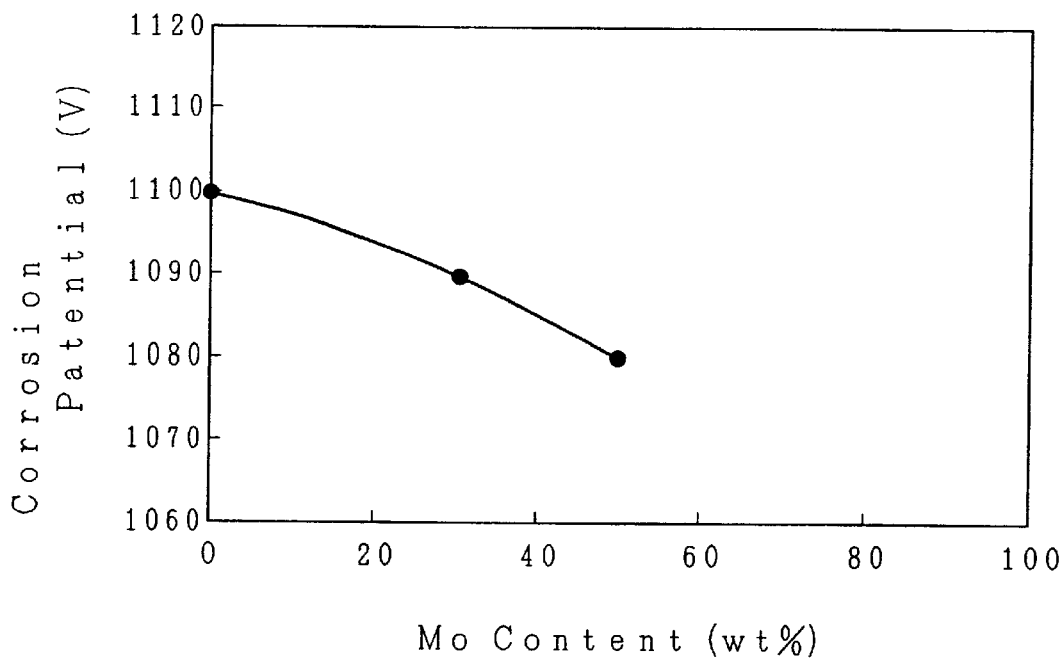
FIG. 7 is graph showing the result of a change in the corrosion potentials of pure Cr and a Cr—Mo alloy in an aqueous solution of ceric nitrate measured by changing the content of Mo.
Figure 8:
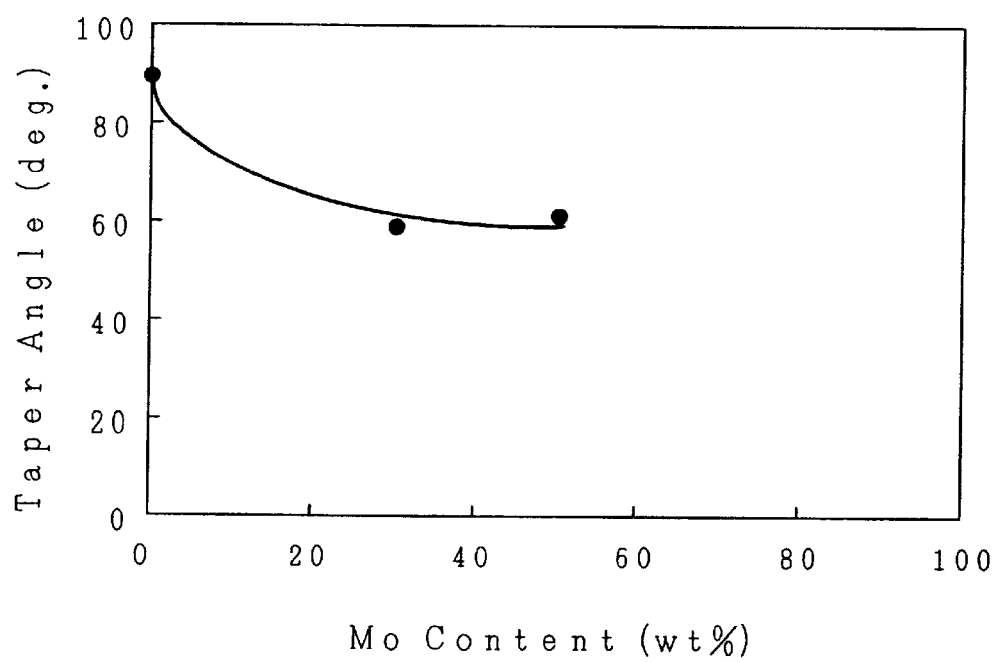
FIG. 8 is a graph showing a change in a taper angle when the composition of the Cr—Mo alloy to be combined with the pure Cr is changed.
Figure 9:
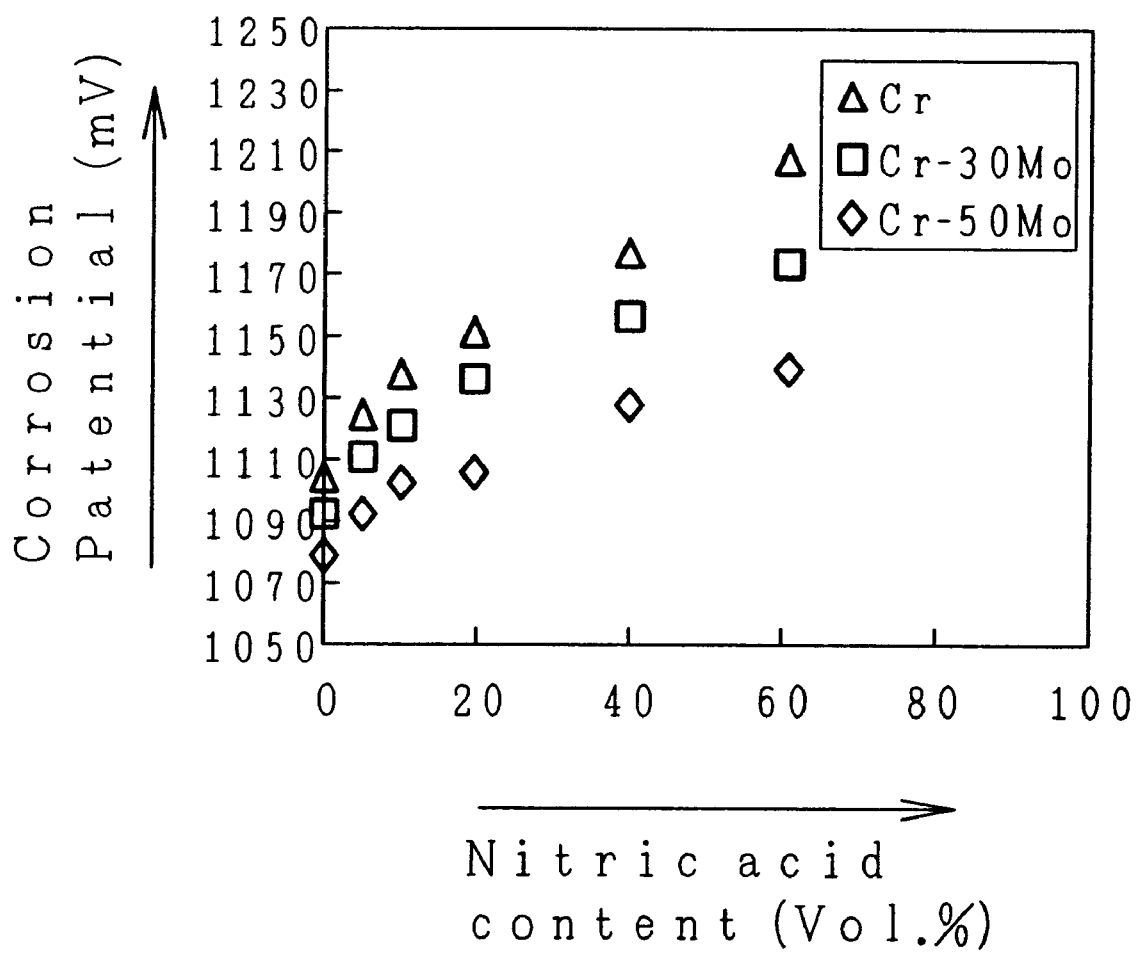
FIG. 9 is a graph showing a change in corrosion potential with respect to the amount of $HNO_3$ to be added to ceric ammonium nitrate.
Figure 10A:
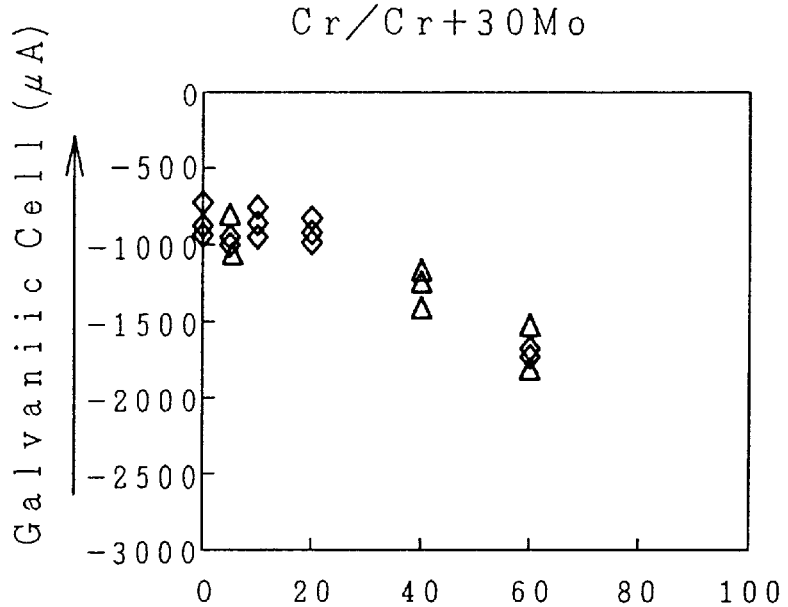
FIGS. 10(a) and 10(b) are graphs showing a change in galvanic current with respect to the amount of $HNO_3$ to be added to ceric ammonium nitrate.
Figure 10B:
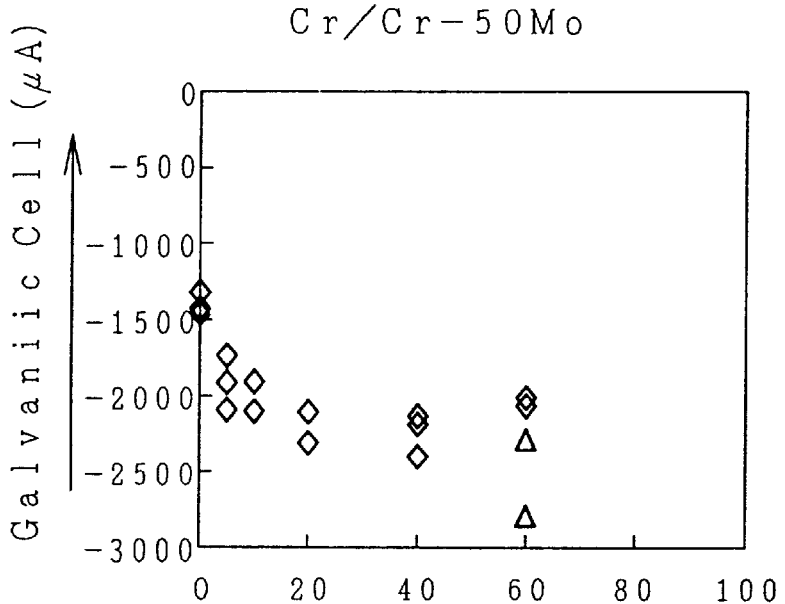

The liquid crystal panel thus prepared is assembled with the various components, as described with reference to FIG. 7, to provide the liquid crystal display device.

In the above-described embodiment, for the gate line 2, pure Cr is used for the substrate-side layer (the first layer; the lower layer), while a single-layer Cr—Mo alloy layer is used for the upper layer (the second layer), and a single-layer Cr—Mo alloy layer is used for each of the drain line 3 and the source line 4. However, the present invention is not limited to this construction, and the drain line may have a laminated structure similar to that of the gate line, and the manufacturing method to be adopted in this case is similar to the process for manufacturing the gate line.

It is needless to say that the above-specified Cr can be replaced in a single or alloy state by a metallic material for a wiring (electrode) material having the necessary working characteristics, as noted by the invention, such as aluminum (Al), titanium (Ti), tungsten (W) or other.

As described hereinabove, according to the present invention, a satisfactory tapered shape can be given, particularly, to the side end face of the scanning signal line to be formed at the thin film transistor TFT thereby to prevent film defects such as cracks, pinholes or disconnection of the various thin films overlying the scanning signal line, as well as short-circuiting between the upper and lower layers.

By adopting such a laminated structure for the scanning signal line, which has a lower layer of pure chromium and an upper layer of a chromium-molybdenum alloy, on the other hand, the contact of the other scanning signal lines and the electrodes to be formed thereover and the metallic thin film is improved. By using pure chromium as the layer on the substrate side, the adhesion with the substrate is enhanced to prevent the occurrences film separation which might otherwise be caused the thermal hysteresis or stress at a subsequent working step.

By giving the right-tapered shape of 60° or less to the side end face of the lower wiring line, moreover, the surface of the thin film transistor substrate can be smoothed to reduce the orientation defects or the like of the liquid crystal, thereby to provide a liquid crystal display device having an excellent contrast.

Here, the present invention should not be limited to the so-called "longitudinal field type liquid crystal display device", as has been described in connection with the embodiment, but can likewise be applied to the so-called "transverse field type liquid crystal display device", in which the common electrode is also formed on the side of the active matrix substrate, or another type liquid crystal display device having a crossing portion, across which the electrode wiring lines or the like cross each other, or a variety of similar semiconductor devices.

What is claimed is:

1. A liquid crystal display device comprising a wiring line having a laminated structure including a first metal layer formed over an insulating substrate and a second metal layer formed over said first metal layer,
    wherein, said second metal layer is different in corrosion potential from said first metal layer and, on the basis of a difference in corrosion potential between said first metal layer and said second metal layer, said first metal layer has an end face formed in a tapered shape extending from a surface of said insulating substrate in a direction toward a central portion of said second metal layer at an angle not greater than 60° formed between the surface of said insulating layer and the end face of said first metal layer, said second metal layer has an end face extending in a direction substantially 90° to the surface of said insulating substrate or extending in a direction from an upper surface of the end face of said first metal layer toward an upper surface of said second metal layer in a direction away from the central portion of said second metal layer which is at an angle greater than 90° with respect to the surface of said insulating substrate, and said second metal layer has a thickness not greater than ½ of that of said first metal layer.

2. A liquid crystal display device comprising a wiring line having a laminated structure including a first metal layer formed over an insulating substrate and a second metal layer formed over said first metal layer, wherein said second metal layer is different in corrosion potential from said first metal layer, said first metal layer has an end face formed in a shape tapered so as to extend from a surface of said insulating substrate in a direction toward a central portion of said second metal layer at an angle not greater than 60° formed between the surface of said insulating substrate and the end face of said first metal layer, said second metal layer has an end face set at approximately 90° with respect to the surface of said insulating substrate, and said second metal layer has a thickness not greater than ½ of that of said first layer.

3. A liquid crystal display device according to claim 2, wherein a bed layer made from a thin-film layer of an insulating material is formed over said second metal layer.

4. A liquid crystal display device comprising a wiring line having a laminated structure including a first metal layer formed over an insulating substrate and a second metal layer formed over said first metal layer, wherein said second metal layer is different in corrosion potential from said first metal layer, said first metal layer has an end face formed in a shape tapered so as to extend from a surface of said insulating layer in a direction toward a central portion of said second metal layer at an angle not greater than 60° formed between the surface of said insulating substrate and the end face of said first metal layer, said second metal layer has an end face extending in a direction from an upper surface of the end face of said first metal layer toward an upper surface of said second metal layer in a direction away from the central portion of said second metal layer which is at an angle greater than 90° with respect to the surface of said insulating substrate, and said second metal layer has a thickness not greater than ½ of that of said first metal layer.

5. A liquid crystal display device comprising: one substrate having a plurality of wiring lines including a scanning signal line, a video signal line and an electrode, and an active element connected with said scanning signal line and said video signal line for controlling ON/OFF operation of a pixel; another substrate Including at least a color filter; and a liquid crystal filled in a clearance between said one substrate and said another substrate,
    wherein any of said wiring lines or said electrode has a laminated structure including a first metal layer formed over said one substrate and made of chromium at its principal component, and a second layer formed over said first layer and made of chromium and molybdenum as its principal component, said second layer having a greater content of said chromium than a content of said molybdenum and a lesser content of said chromium than a content of chromium in said first metal layer, and said second layer has a thickness not greater than ½ of that of said first metal layer.

6. A liquid crystal display device according to claim 5, wherein said first metal layer has an end face formed in a tapered shape so as to extend from a surface of said one substrate in a direction toward a central portion of said second metal layer at an angle not greater than 60° formed between the surface of said one substrate and the end face of said first metal layer, and said second layer has a side end face formed so as to extend substantially perpendicular to said one substrate.

7. A liquid crystal display device according to claim 5, wherein said first metal layer has an end face formed in a tapered shape so as to extend from a surface of said one substrate in a direction toward a central portion of said second metal layer at an angle not greater than 60° formed between the surface of said one substrate and the end face of said first metal layer, and said second layer has a side end face extending in a direction from an upper surface of said first metal layer toward an upper surface of said second metal layer away from the central portion of said second metal layer which is at an angle greater than 90° with respect to the surface of said one substrate.

8. A liquid crystal display device according to any of claims 5 to 7, wherein said scanning signal line has a two-layer structure and a pixel electrode is formed of an indium tin oxide film, and said electrode includes an added capacity element formed at least partially under said pixel electrode.

9. A method of manufacturing a liquid crystal display device which includes: one substrate having a plurality of wiring lines including a scanning signal line, a video signal line and an electrode, and an active element connected with said scanning signal line and said video signal line for controlling ON/OFF operation of a pixel;

another substrate including at least a color filter and adhered through a minute clearance to said one substrate; and a liquid crystal filled in a clearance between said one substrate and said another substrate, said method comprising the steps of:
1) preparing said scanning signal line as a thin film having a laminated structure including a lower metal layer and an upper metal layer which are respectively made of metals having different compositions by a step of forming said lower metal layer over said one substrate and a step of forming said upper metal layer on said first metal layer;
2) applying photoresist on said upper metal layer;
3) selectively exposing said photoresist through a photo mask;
4) developing said photoresist;
5) dipping said one substrate in an etching liquid to which a corrosion potential conditioning liquid is added; and
6) setting a corrosion potential of said upper metal layer lower than a corrosion potential of said lower metal layer in said etching liquid to cause an electrochemical reaction between said upper metal layer and said lower metal layer and making an etching rate of said upper metal layer having a lower corrosion potential faster than an etching rate of said lower metal layer, thereby to form a side end face of said lower metal layer shape extending at an angle not greater than 60° formed from a surface of said one substrate in a direction toward a central portion of said upper metal layer and to give a side end face of said upper metal layer extending from an upper part of the end face of said lower metal layer toward an upper surface of said upper metal layer in a direction away from the central portion of said upper metal layer which is at an angle greater than 90° with respect to the surface of said one substrate, and said upper metal layer has a thickness not greater than ½ of that of said lower metal layer.

10. A method for manufacturing a liquid crystal display device according to claim 9, wherein a content of said potential conditioning liquid in said etching liquid is not more than 60 Vol. %.

11. A method for manufacturing a liquid crystal display device according to claim 10, wherein said etching liquid includes ceric ammonium nitrate.

12. A method for manufacturing a liquid crystal display device according to claim 11, wherein said potential conditioning liquid is nitric acid.

13. A method for manufacturing a liquid crystal display device according to claim 9, wherein said etching liquid includes ceric ammonium nitrate.

14. A method for manufacturing a liquid crystal display device according to claim 13, wherein said potential conditioning liquid is liquid nitric acid.

* * * * *